(12) United States Patent
Hedderly

(10) Patent No.: US 8,317,964 B2
(45) Date of Patent: Nov. 27, 2012

(54) METHOD OF MANUFACTURING A VEHICLE

(75) Inventor: Gregory Thomas Hedderly, White Lake, MI (US)

(73) Assignee: Ford Motor Company, Dearborn, MI (US)

( * ) Notice: Subject to any disclaimer, the term of this patent is extended or adjusted under 35 U.S.C. 154(b) by 766 days.

(21) Appl. No.: 11/622,164

(22) Filed: Jan. 11, 2007

(65) Prior Publication Data

US 2008/0201952 A1 Aug. 28, 2008

(51) Int. Cl.
| B29C 65/00 | (2006.01) |
| B60J 7/00  | (2006.01) |
| B32B 37/00 | (2006.01) |
| B62D 27/00 | (2006.01) |
| B21D 53/88 | (2006.01) |
| C09J 5/00  | (2006.01) |
| C09J 5/02  | (2006.01) |

(52) U.S. Cl. ........ 156/304.5; 29/897.2; 29/428; 296/29; 296/193.07; 156/60; 156/293; 156/295; 156/304.1; 156/304.2; 156/304.3; 156/305; 156/307.3

(58) Field of Classification Search ................ 29/897.2; 296/29; 156/60
See application file for complete search history.

(56) References Cited

U.S. PATENT DOCUMENTS

| 687,114 A | 11/1901 | Brown |
| 691,661 A | 1/1902 | Priest |
| 732,389 A | 6/1903 | Wheater |
| 1,768,368 A | 6/1930 | Menzies |
| 1,833,098 A | 11/1931 | Voytko |
| 2,062,177 A | 11/1936 | Herron |
| 2,192,075 A | 2/1940 | Gregoire |
| 2,382,376 A | 8/1945 | Black |
| 3,412,628 A | 11/1968 | De Gain |
| 3,759,351 A | 9/1973 | Purple |
| 3,915,486 A | 10/1975 | Maeda et al. |
| 4,019,298 A | 4/1977 | Johnson, IV |
| 4,272,114 A | 6/1981 | Hirano et al. |
| 4,431,221 A | 2/1984 | Jahnle |
| 4,457,555 A * | 7/1984 | Draper ....................... 296/181.4 |
| 4,503,926 A | 3/1985 | von Sivers |
| 4,573,734 A | 3/1986 | Gass |
| 4,676,545 A | 6/1987 | Bonfilio et al. |
| 4,702,515 A | 10/1987 | Kato et al. |
| 4,842,326 A | 6/1989 | DiVito |
| 4,874,200 A | 10/1989 | Nasu et al. |
| 4,887,859 A | 12/1989 | Aper |
| 4,900,083 A | 2/1990 | Kumasaka et al. |
| 4,900,090 A | 2/1990 | Davis |
| 4,914,802 A | 4/1990 | Takao et al. |
| 4,968,087 A | 11/1990 | Goria |
| 4,976,481 A | 12/1990 | Yoshihira |
| 4,978,164 A | 12/1990 | Nakamura et al. |
| 5,593,245 A | 1/1997 | Herz et al. |
| 5,597,198 A | 1/1997 | Takanishi et al. |

(Continued)

OTHER PUBLICATIONS

U.S. Appl. No. 11/622,175, Hedderly.

(Continued)

*Primary Examiner* — Sing P Chan
*Assistant Examiner* — Alex Efta
(74) *Attorney, Agent, or Firm* — Damian Porcari; Brooks Kushman P.C.

(57) ABSTRACT

A method of manufacturing a vehicle. A set of vehicle body structure components is assembled with interlocking mating features.

11 Claims, 34 Drawing Sheets

U.S. PATENT DOCUMENTS

| | | | |
|---|---|---|---|
| 5,611,593 A * | 3/1997 | Fukagawa et al. | 296/204 |
| 5,738,405 A | 4/1998 | Richters et al. | |
| 5,806,917 A | 9/1998 | Townsend | |
| 5,882,054 A | 3/1999 | Devilliers et al. | |
| 5,915,781 A * | 6/1999 | DeRees | 296/203.01 |
| 5,921,611 A | 7/1999 | Townsend | |
| 6,000,748 A | 12/1999 | Tomforde et al. | |
| 6,010,182 A | 1/2000 | Townsend | |
| 6,119,407 A * | 9/2000 | Staser et al. | 49/502 |
| 6,217,251 B1 | 4/2001 | Kato et al. | |
| 6,253,588 B1 | 7/2001 | Rashid et al. | |
| 6,276,477 B1 | 8/2001 | Ida | |
| 6,327,981 B1 | 12/2001 | Norregaard et al. | |
| 6,334,252 B1 * | 1/2002 | Sato et al. | 29/897.2 |
| 6,334,645 B1 | 1/2002 | Ban | |
| 6,371,551 B1 | 4/2002 | Hedderly | |
| 6,428,087 B1 | 8/2002 | Frasher et al. | |
| 6,431,549 B1 | 8/2002 | Hill et al. | |
| 6,450,567 B2 | 9/2002 | Toba et al. | |
| 6,470,573 B2 | 10/2002 | Tarahomi | |
| 6,474,709 B2 | 11/2002 | Artner | |
| 6,488,330 B2 | 12/2002 | Hedderly | |
| 6,493,920 B1 | 12/2002 | Hill et al. | |
| 6,561,573 B2 | 5/2003 | Carcioffi | |
| 6,595,581 B2 * | 7/2003 | Wolkersdorfer et al. | 296/204 |
| 6,669,275 B2 | 12/2003 | Frasher et al. | |
| 6,688,674 B2 | 2/2004 | Sato et al. | |
| 6,695,393 B1 | 2/2004 | Aouadi et al. | |
| 6,820,918 B1 | 11/2004 | DeBono | |
| 6,820,924 B2 | 11/2004 | Caliskan et al. | |
| 6,854,789 B2 | 2/2005 | Kloepfer | |
| 6,890,014 B1 | 5/2005 | King et al. | |
| 6,896,319 B1 * | 5/2005 | Huang et al. | 296/193.04 |
| 7,032,953 B2 | 4/2006 | Rangnekar et al. | |
| 7,185,945 B2 | 3/2007 | Dandekar et al. | |
| 7,216,911 B2 | 5/2007 | Andre et al. | |
| 7,261,345 B2 | 8/2007 | Akad | |
| 7,267,394 B1 | 9/2007 | Mouch et al. | |
| 7,396,072 B2 | 7/2008 | Fischer et al. | |
| 7,469,956 B2 | 12/2008 | Yasuhara et al. | |
| 7,494,177 B2 | 2/2009 | Henning | |
| 7,591,502 B2 | 9/2009 | Hedderly | |
| 2001/0020795 A1 | 9/2001 | Toba et al. | |
| 2001/0033096 A1 * | 10/2001 | Hanyu | 296/203.01 |
| 2002/0158484 A1 | 10/2002 | Delavalle et al. | |
| 2002/0162224 A1 | 11/2002 | Gabbianelli et al. | |
| 2003/0081996 A1 | 5/2003 | Sun et al. | |
| 2003/0085017 A1 | 5/2003 | Guetlbauer et al. | |
| 2003/0085586 A1 | 5/2003 | Kiousis et al. | |
| 2003/0168880 A1 * | 9/2003 | Burkel et al. | 296/103 |
| 2005/0017538 A1 * | 1/2005 | Omori et al. | 296/146.6 |
| 2005/0017543 A1 | 1/2005 | Riley et al. | |
| 2005/0057076 A1 | 3/2005 | Roux et al. | |
| 2005/0151392 A1 | 7/2005 | Yasukouchi et al. | |
| 2005/0285430 A1 | 12/2005 | Gerlach et al. | |
| 2006/0028052 A1 | 2/2006 | Dandekar et al. | |
| 2006/0049668 A1 | 3/2006 | Eipper et al. | |
| 2006/0061137 A1 | 3/2006 | Stojkovic et al. | |
| 2006/0061145 A1 | 3/2006 | Strebe et al. | |
| 2006/0097546 A1 | 5/2006 | Lynam et al. | |
| 2006/0108834 A1 | 5/2006 | Boulay et al. | |
| 2006/0131931 A1 | 6/2006 | Marijnissen et al. | |
| 2006/0175871 A1 | 8/2006 | Eipper et al. | |
| 2006/0237996 A1 * | 10/2006 | Eipper et al. | 296/193.04 |
| 2007/0021048 A1 | 1/2007 | Henning | |
| 2007/0270029 A1 | 11/2007 | Schroeder et al. | |
| 2008/0098601 A1 | 5/2008 | Heinz et al. | |
| 2008/0116719 A1 | 5/2008 | Bae | |
| 2008/0238145 A1 | 10/2008 | Pilette et al. | |

OTHER PUBLICATIONS

U.S. Appl. No. 11/622,154, Hedderly.
U.S. Appl. No. 11/622,146, Hedderly.
U.S. Appl. No. 11/622,137, Hedderly.
U.S. Appl. No. 11/622,128, Hedderly.
U.S. Appl. No. 11/622,125, Hedderly.
U.S. Appl. No. 11/622,117, Hedderly.
U.S. Appl. No. 11/622,116, Hedderly.
U.S. Appl. No. 11/622,105, Hedderly.
U.S. Appl. No. 11/622,100, Hedderly.
U.S. Appl. No. 11/622,396, Hedderly.
U.S. Appl. No. 11/622,091, Hedderly.
U.S. Appl. No. 11/622,084, Hedderly.
U.S. Appl. No. 11/622,111, Hedderly.
U.S. Appl. No. 11/622,175.
U.S. Appl. No. 11/622,154.
U.S. Appl. No. 11/622,146.
U.S. Appl. No. 11/622,137.
U.S. Appl. No. 11/622,128.
U.S. Appl. No. 11/622,125.
U.S. Appl. No. 11/622,117.
U.S. Appl. No. 11/622,116.
U.S. Appl. No. 11/622,105.
U.S. Appl. No. 11/622,100.
U.S. Appl. No. 11/622,096.
U.S. Appl. No. 11/622,091.
U.S. Appl. No. 11/622,084.
U.S. Appl. No. 11/622,111.

* cited by examiner

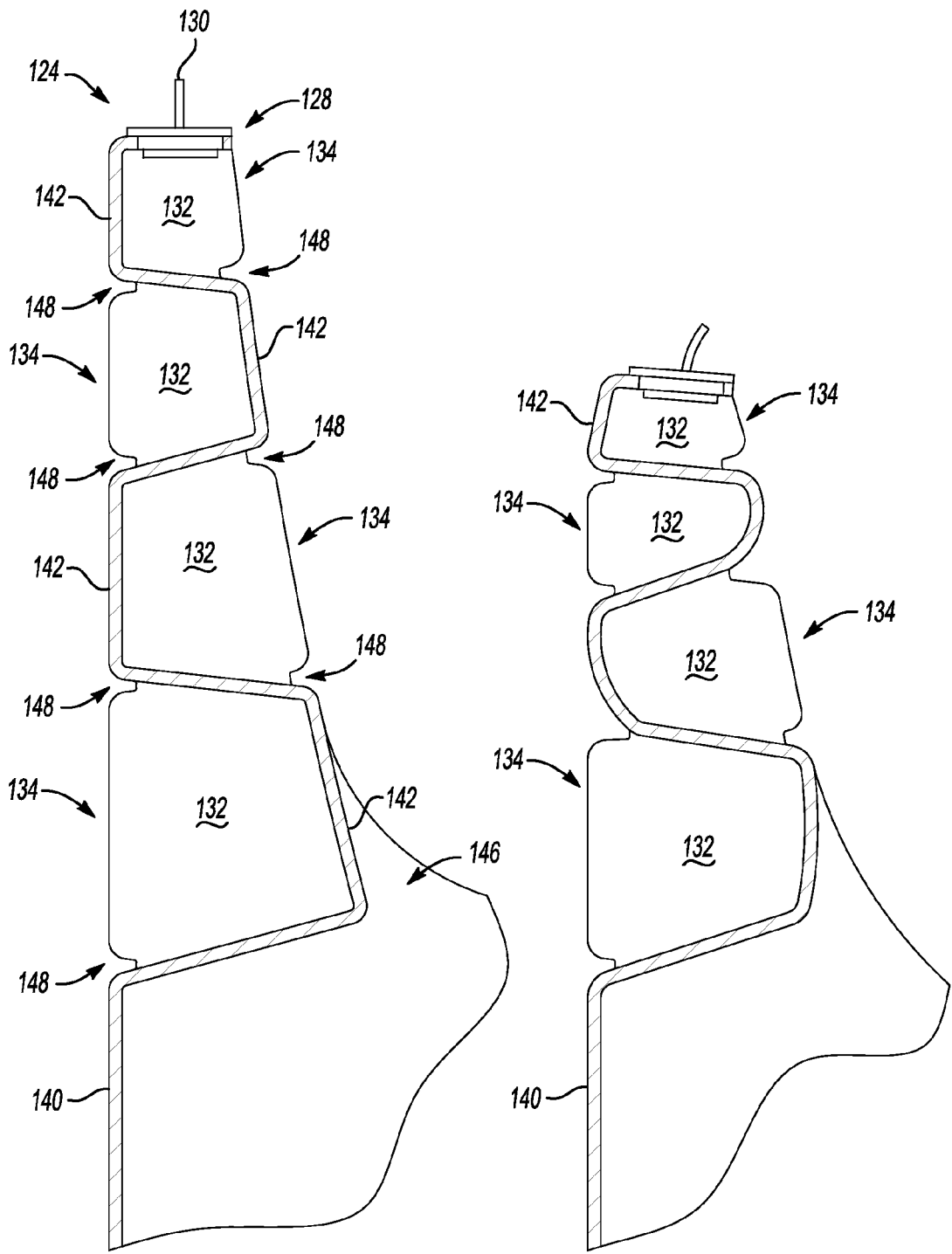

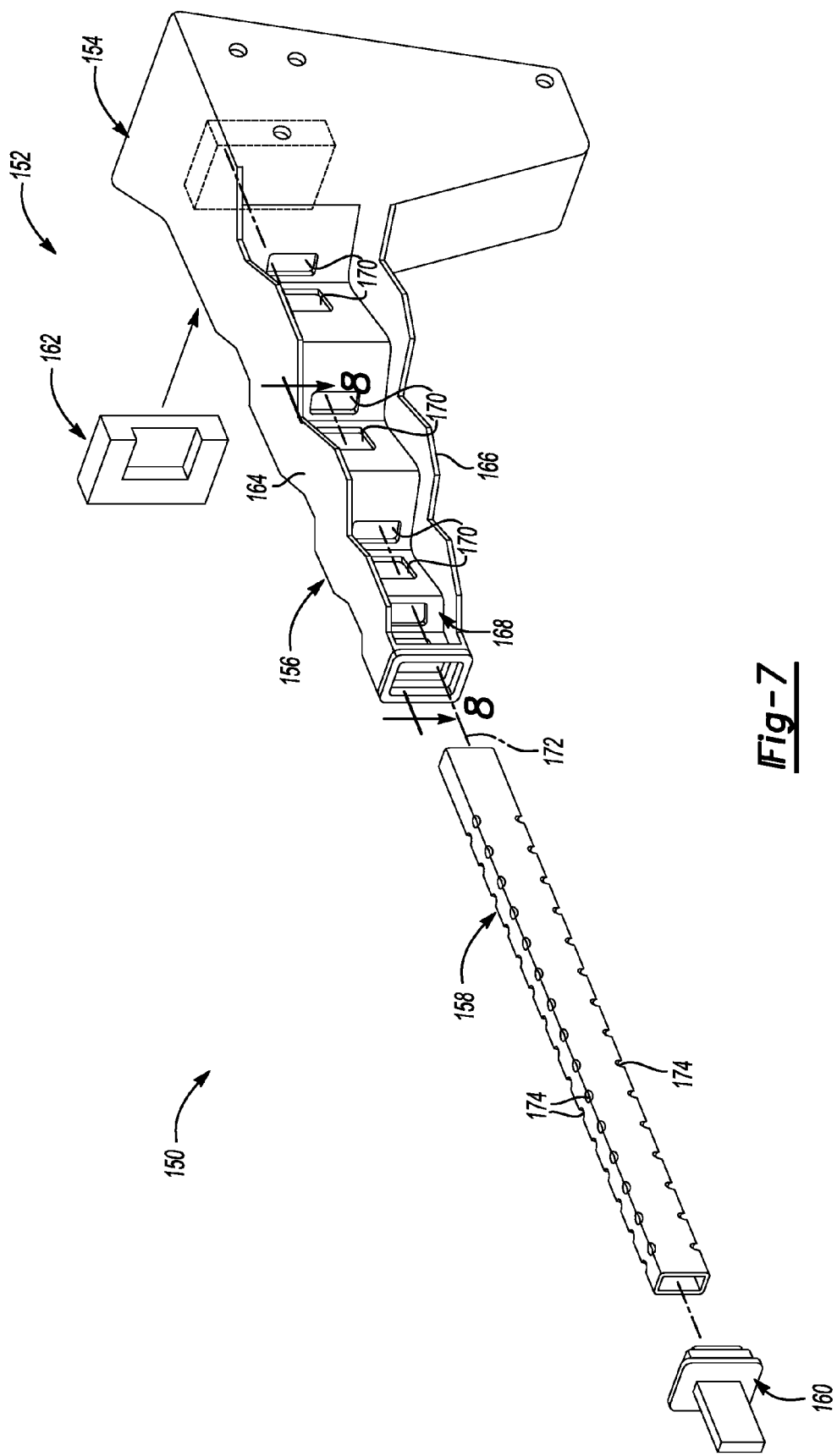

METHOD OF MANUFACTURING A VEHICLE

BACKGROUND OF THE INVENTION

Field of the Invention

The present invention relates to a method of manufacturing a vehicle.

SUMMARY OF THE INVENTION

In at least one embodiment of the present invention, a method of manufacturing a vehicle is provided. The method includes providing a set of cast vehicle body structure components. Each member of the set of cast vehicle body structure components has a mating feature. Each member of the set of cast vehicle body structure components is assembled to at least one other member of the set by interlocking the mating features.

In at least one other embodiment of the present invention, a method of manufacturing a vehicle is provided. The method includes providing a set of vehicle body structure components, selecting first and second subsets from the set of vehicle body structure components, assembling a floor portion by interlocking each member of the first subset to another member of the first subset, assembling an upper portion by engaging each member of the second subset to another member of the second subset, and assembling the upper portion to the floor portion.

In at least one embodiment of the present invention, a method of manufacturing a vehicle is provided. The method includes providing first and second sets of castings, assembling a floor portion by interlocking the members of the first set of castings, assembling an upper portion by interlocking the members of the second set of castings without welding, and assembling the upper portion to the floor portion.

BRIEF DESCRIPTION OF THE DRAWINGS

FIG. 5 is a top section view of an embodiment of the inner fender structure shown in FIG. 4 along section line 5-5.

FIG. 6 is a top section view of the inner fender structure of FIG. 5 in an exemplary deformed condition.

FIG. 7 is a perspective view of another embodiment of an inner fender structure.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
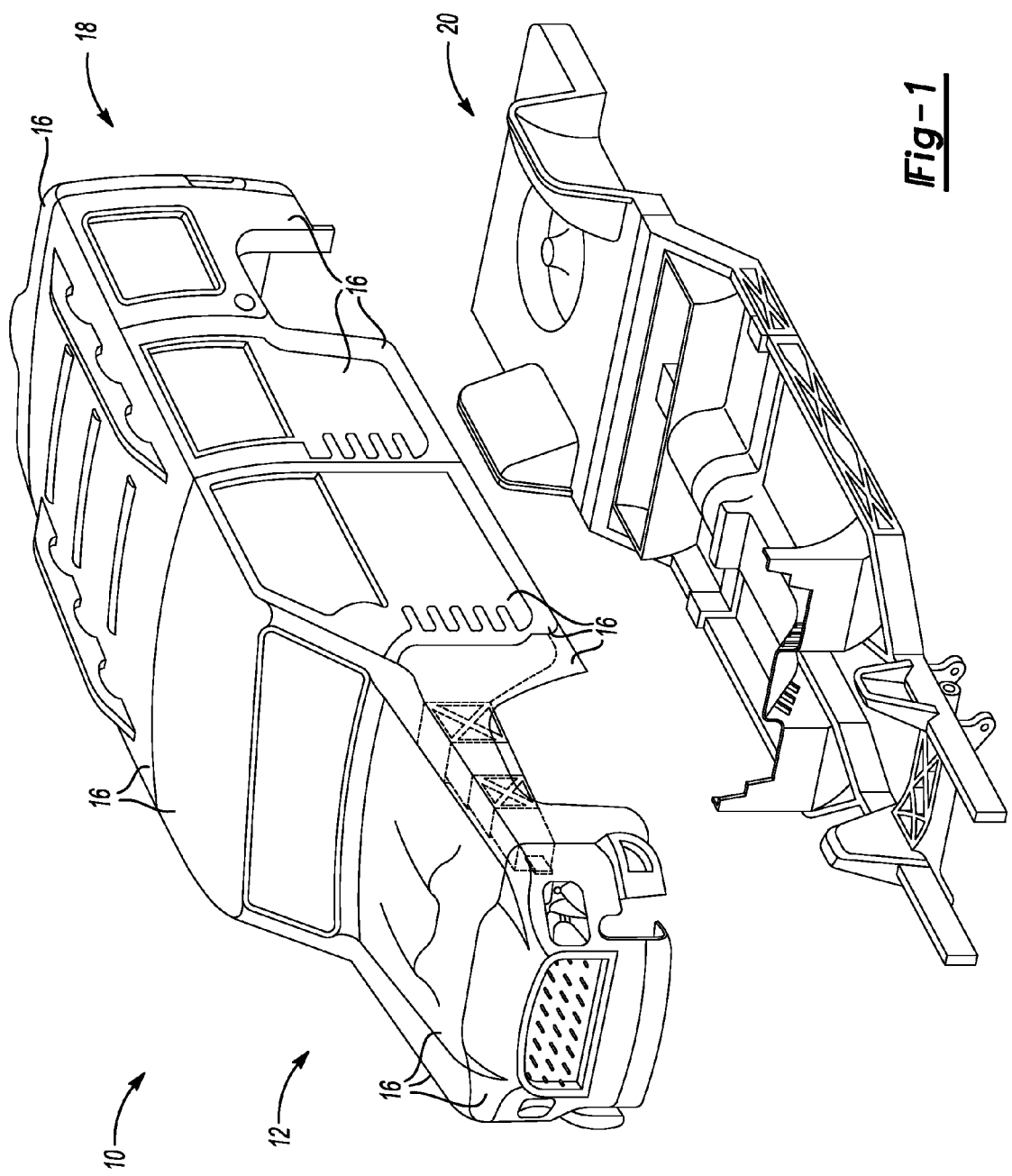
FIG. 1 is a partially exploded perspective view of an exemplary vehicle having a vehicle body assembly.
Figure 2:
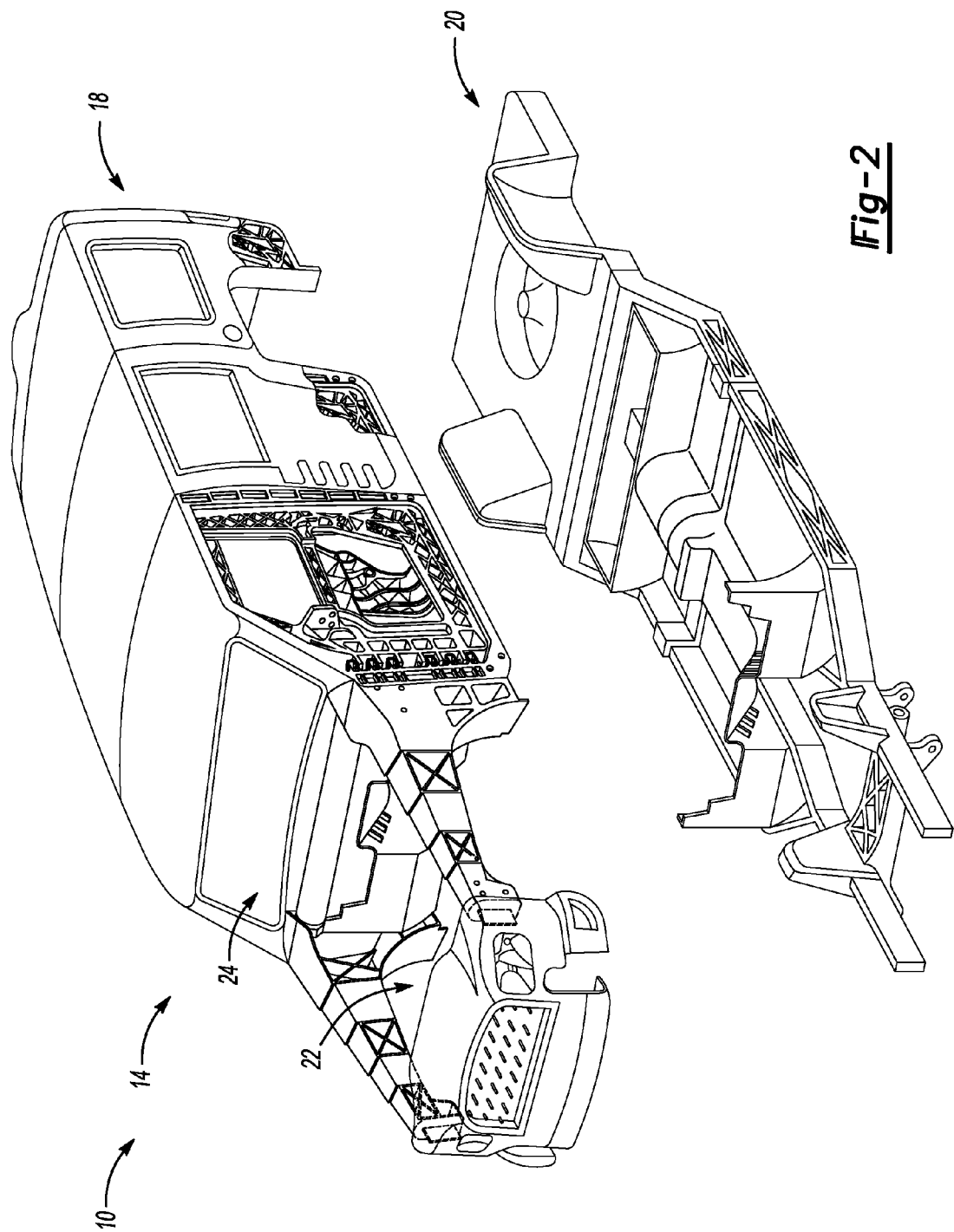
FIG. 2 is a partially exploded perspective view of the vehicle body assembly of FIG. 1 having a vehicle body structure.

Referring to FIGS. 1 and 2, an exemplary vehicle 10 is shown. The vehicle 10 may be of any suitable type, such as a motor vehicle like an automobile. For clarity, the vehicle 10 is shown without select components, such as wheels, tires, and drivetrain components.

The vehicle 10 may include a vehicle body assembly 12 having a vehicle body structure 14 and a plurality of body panels 16. For illustration purposes, at least a portion of the body panels 16 are fragmented or removed in FIG. 2 to better show the vehicle body structure 14.

The vehicle body assembly 12 and vehicle body structure 14 may include an upper portion 18 and a lower portion 20. The upper portion 18 may define at least a portion of an engine compartment 22 and at least a portion of a passenger compartment 24. In the embodiment shown, the engine compartment 22 is disposed proximate the front of the vehicle 10; however, the engine compartment 22 may be disposed in any suitable location, such as toward the rear of the vehicle 10. The body panels 16 may be disposed on the upper portion 18 as will be described in more detail below. In addition, one or more closures, such as a door, hood, liftgate, tailgate, trunk lid, hatchback, or the like, may be moveably disposed on the upper portion 18.

The lower portion 20 may generally be disposed under the upper portion 18 and may also define at least a portion of the engine compartment 22 and/or the passenger compartment 24. The lower portion 20 may at least partially define a floor assembly in one or more embodiments of the present invention as will be discussed in more detail below.

Figure 3:
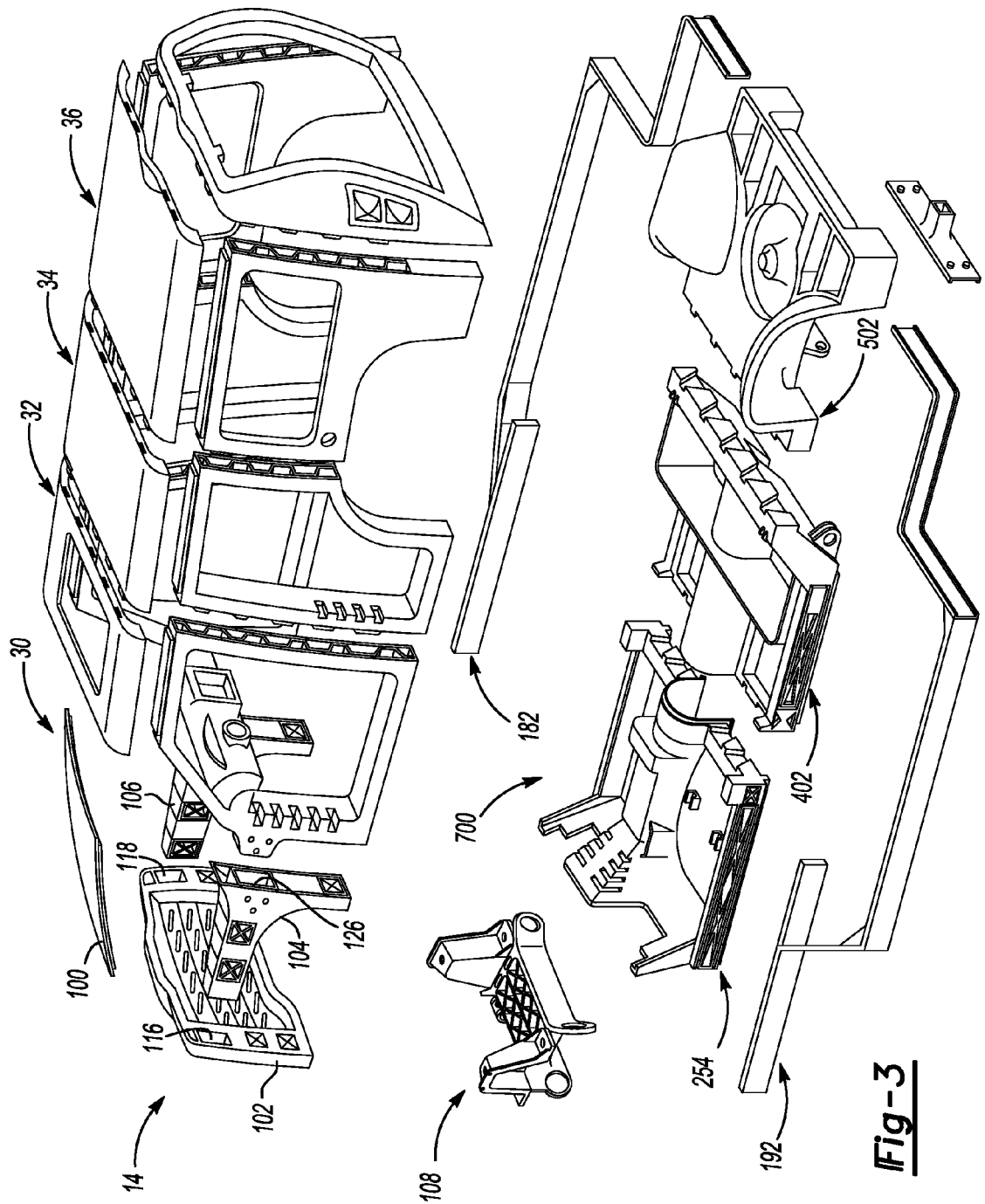
FIG. 3 is an exploded perspective view of a portion of the vehicle body structure shown in FIG. 2.

Referring to FIG. 3, an exploded view of the vehicle body structure 14 is shown. For clarity, closure structures associated with the passenger compartment 24 are not shown to better illustrate other components of the vehicle body structure 14.

The vehicle body structure 14 may be made up of a set of components. A member of the set of body structure components may interlock with at least one another member of the set when the vehicle body structure 14 is assembled. The interlocking members of the set may have different configurations and may include one or more types of mating features as will be described in more detail below.

In at least one embodiment, at least some of the members of the set of body structure components may be provided as castings and may be provided with integral mating features. For example, the integral mating features may be cast as part of an associated body structure component, thereby providing a one-piece construction. In addition, members of the set of body structure components may be made of any suitable material. For example, at least some of the members of the set of body structure components may be made of a magnesium alloy to provide desirable strength, weight, and manufacturability characteristics.

The vehicle 10, vehicle body assembly 12, and/or vehicle body structure 14 may include a plurality of zones. Each zone may include a subset of the set of body structure components and may include one or more components that are part of the upper and lower portions 18,20. For example, the vehicle body structure 14 may include a first zone 30 disposed proximate a front end of the vehicle 10, a second zone 32 that may be disposed adjacent to the first zone 30, a third zone 34 that may be disposed adjacent to the second zone 32, and a fourth zone 36 that may be disposed adjacent to the third zone 34 and proximate a rear end of the vehicle 10.

Figure 4:
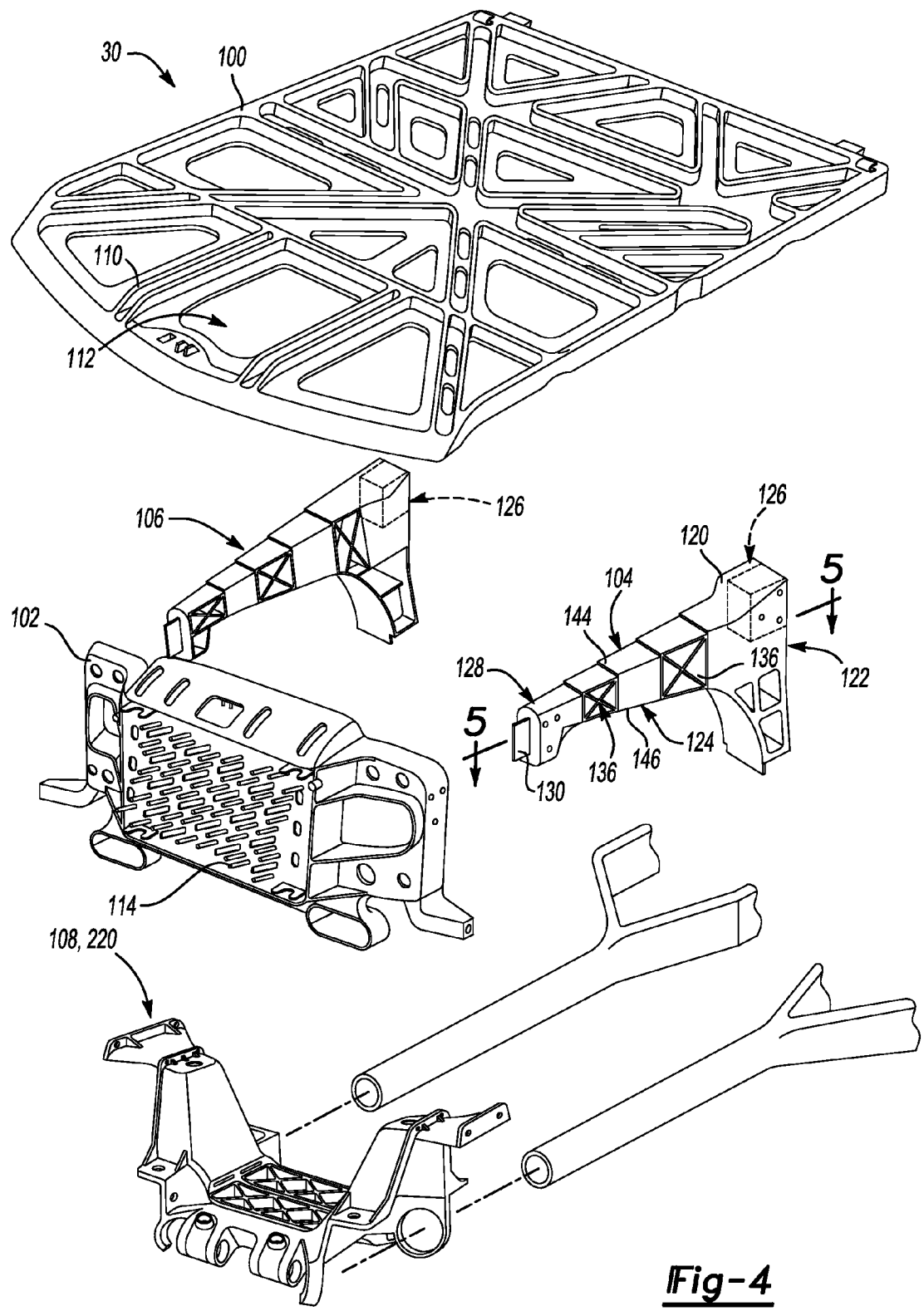
FIG. 4 is an exploded perspective view of a first zone of the vehicle.

Referring to FIG. 4, an exploded view of an exemplary first zone 30 of the vehicle 10 is shown. For clarity, the first zone 30 is shown without body panels to more clearly depict the underlying portion of the vehicle body structure 14. The first zone 30 may at least partially define the engine compartment 22 of the vehicle 10 and may include a hood closure structure 100, a front end structure 102, a first inner fender structure 104, a second inner fender structure 106, and an engine support structure 108.

The hood closure structure 100 may be pivotally attached to another vehicle body structure component to cover or provide access to the engine compartment 22. The hood closure structure 100 may include a plurality of ribs 110 that provide structural reinforcement and a plurality of openings 112 to reduce weight and material usage. In at least one embodiment, the hood closure structure 100 may be a casting. In addition, one or more body panels may be disposed proximate the hood closure structure 100 to at least partially conceal the hood closure structure 100 and provide an exterior vehicle surface.

The front end structure 102 may be provided proximate the front end of the vehicle 10. In at least one embodiment, the front end structure 102 may extend across the front end of the vehicle 10 and may include one or more airflow openings 114 that permit airflow toward the engine compartment 22. In addition, the front end structure 102 may include openings for receiving other vehicle components, such as lights or latches, and may receive a front end bumper structure and/or body panel.

The front end structure 102 may include mating features for engaging another vehicle body structure component. For example, as is best shown in FIG. 3 the front end structure 102 may include first and second front end mating features 116, 118 that engage or interlock with the first and second inner fender structures 104,106, respectively. In one or more embodiments of the present invention, one or more fasteners may be used to couple the front end structure 102 to the first and second inner fender structures 104,106.

The first and second inner fender structures 104,106 may be configured to absorb energy during a vehicle impact event to help protect a vehicle occupant. For instance, the inner fender structures 104,106 may be configured to distort (e.g., fold, buckle, collapse, or otherwise change shape) when sufficient force is transmitted to an inner fender structure.

The first and second inner fender structures 104,106 may be spaced apart from each other and disposed along opposite sides of the vehicle 10. In the embodiment shown in FIG. 4, the first and second inner fender structures 104,106 are generally configured as mirror images of each other. For simplicity, only the first inner fender structure 104 will be described in detail below with the understanding that the second inner fender structure 106 may have similar attributes.

The inner fender structure 104 may include a body 120 having a mounting portion 122 and an arm portion 124 that extends from the mounting portion 122. The body 120 may be provided such that the mounting and arm portions 122,124 are integrally formed as a one-piece component.

The mounting portion 122 may be adapted to mount to another vehicle body structure component as will be described in more detail below. In at least one embodiment, the mounting portion 122 may include a mating feature 126 configured as a mortise.

The arm portion 124 may extend from the mounting portion 122 toward the front of the vehicle 10. The arm portion 122 may have a distal end 128 spaced apart from the mounting portion 122. The distal end 128 may engage or interlock with the front end structure 102. In addition, one or more mating features 130 may be associated with the distal end 128. The distal end 128 and/or the mating features 130 may have a male configuration, female configuration, or combinations thereof. The arm portion may be disposed toward an upper surface of the vehicle 10 to help counter "vaulting" or lifting of the rear wheels from the ground and to help occupants remain in a location where one or more occupant protection devices may be effective during a vehicle impact event.

Referring to FIGS. 4 and 5, one embodiment of an arm portion 124 is shown in more detail. The arm portion 124 may include a plurality of pockets 132. Each pocket 132 may include at least one opening 134. The openings 134 of adjacent pockets may be disposed along opposite sides of the arm portion 124. As such, the arm portion 124 may be configured to distort in a preconfigured manner when sufficient force is transmitted to the arm portion 124. In addition, at least one reinforcement feature 136 may partially fill one or more pockets 132 to help maintain a pocket configuration under ordinary conditions.

Referring to FIG. 5, a cross section of the arm portion 124 of the inner fender structure 104 is shown. The inner fender structure 104 and/or arm portion 124 may include one or more walls that help define one or more pockets 132. For example, the inner fender structure 104 may include a serpentine wall 140 that at least partially defines one or more pockets 132. As such, one or more portions of the serpentine wall 140 may separate adjacent pockets 132. The pockets 132 may have any suitable configuration. In at least one embodiment, the pockets 132 may increase in size in a direction extending from the distal end 128 toward the mounting portion 122. Moreover, at least a portion of the serpentine wall 140 may be stronger than one or more other walls to help direct or respond to load forces in a desired manner.

A back wall 142 may be disposed opposite one or more openings 134. In the embodiment shown in FIG. 5, the back wall 142 is provided as part of the serpentine wall 140.

First and second longitudinal walls 144,146 may also at least partially define one or more pockets 132. In at least one embodiment, the first and second longitudinal walls 144,146 may be spaced apart from each other and extend from the mounting portion 122. In addition, the first and second longitudinal walls 144,146 may be disposed proximate the serpentine wall 140 and/or back wall 142.

One or more pre-weakened areas 148 may be provided that influence the load bearing characteristics of the arm portion 124. A pre-weakened area 148 may be provided that at least partially extends through one or more walls. For instance, a plurality of pre-weakened areas 148 may be provided in the first and second longitudinal walls 144,146 proximate the serpentine wall 140 and/or an opening 134.

At least some of the walls 140,142,144,146 and pockets 132 may distort when sufficient force is applied. Moreover, the walls 140,142,144,146 and pockets 132 may be configured to withstand different load forces or absorb different amounts of energy. For example, one or more walls and/or pockets may be distorted or change shape under lower load forces than other walls, portions of walls, and/or pockets. In at least one embodiment, the arm portion 124 may be configured to withstand higher load forces closer to the mounting portion 122 than the distal end 128. Moreover, the arm portion 124 may generally be configured to deform prior to deformation of the mounting portion 122.

Referring to FIG. 6, the arm portion 124 of the inner fender structure 104 is shown in an exemplary deformed condition. Deformation may result in a reduction in length of the arm portion 124 due to reduced size or volume of one or more pockets 132. The arm portion 124 may be configured to deform in a predetermined manner. For instance, one or more walls may deform such that a pocket 132 collapses or folds in a predetermined direction. In FIG. 6, a plurality of partially collapsed pockets 132 is shown such that the serpentine wall 140 and partially collapsed pockets are partially folded toward an associated opening 132.

Figures 8, 9:
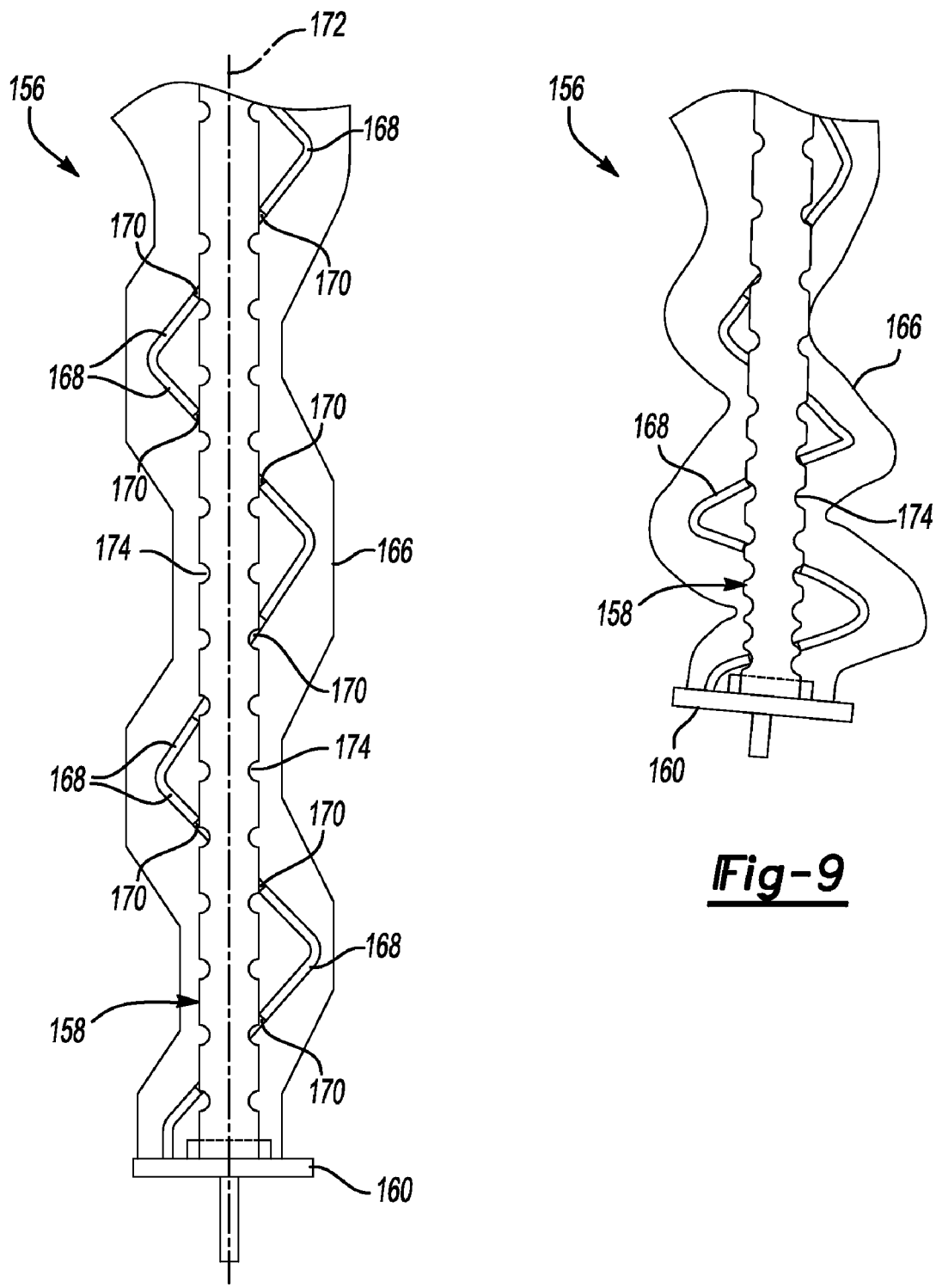
FIG. 8 is a top section view of the inner fender structure of FIG. 7 along section line 8-8.
FIG. 9 is a top section view of the inner fender structure of FIG. 8 in an exemplary deformed condition.

Referring to FIGS. 7 and 8, another embodiment of an inner fender structure 150 is shown. The inner fender structure 150 may include a body 152 having a mounting portion 154 and an arm portion 156 that extends from the mounting portion 154. The body 152 may be provided such that the mounting and arm portions 154,156 are integrally formed as a one-piece component. The inner fender structure 150 may also include a tunable member 158, a first end plate 160, and a second end plate 162.

The mounting portion 154 may be adapted to mount to another vehicle body structure component as will be described in more detail below. The mounting portion 154 may have a similar configuration as described above with respect to inner fender structure 104.

The arm portion 156 may include a first panel 164, a second panel 166, and a set of web panels 168. The first and second panels 164,166 may extend from the mounting portion 154 and may be generally symmetrical and spaced apart from each other. The first and second panels 164,166 may have a configuration that helps the arm portion 156 distort in a predetermined manner as will be described in more detail below.

The web panels 168 may extend between the first and second panels 164,166. In the embodiment shown, the web panels 168 are disposed in a corrugated arrangement such that adjacent web panels 168 are disposed at an angle relative to each other. Each web panel 168 may intersect or be spaced apart from another web panel. In addition, one or more web panels 168 may be disposed generally perpendicular to at least one of the first and second panels 164,166.

One or more of the web panels 168 may include an aperture 170. The apertures 170 may be arranged along an axis 172.

The tunable member 158 may affect the energy absorption characteristics of the inner fender structure 150. The tunable member 158 may have any suitable configuration. In the embodiment shown, the tunable member 158 is configured as a tubular channel. The tunable member 158 may extend through the apertures 170 and may be made of any suitable material, such as a metal like steel. A separator, such as a coating or spacer, may be provided between the tunable member 158 and one or more apertures 170 to inhibit galvanic corrosion in one or more embodiments of the present invention.

The tunable member 158 may include one or more pre-weakened areas 174. The pre-weakened areas 174 may be provided in any suitable manner. For example, the pre-weakened areas 174 may be provided as a plurality of indentations or holes that may be spaced apart from each other and may extend at least partially through the tunable member 158. For example, the pre-weakened areas 174 may be spaced apart from each other in one or more directions, such as in a direction extending along axis 172. The pre-weakened areas 174 may "tune" or configure the tunable member 158 to distort in a predetermined manner when sufficient force is applied as will be discussed in more detail below. As such, different tunable members may be employed to provide different response characteristics for application in different vehicle packages. In addition, the tunable member 158 may be configured such that different areas deform at different load thresholds.

The first and second end plates 160,162 may be adapted to constrain the tunable member 158. The first end plate 160 may be disposed proximate a distal end of the arm portion 156 and proximate a first end of the tunable member 158. The second end plate 162 may be provided at a second end of the tunable member 158 disposed opposite the first end. The first and second end plates 160,162 may be made of any suitable material, such as a metal like steel, and may be adapted to withstand load forces associated with a vehicle impact event. In addition, the first and second end plates 160,162 may be coupled to the inner fender structure 150 in any suitable manner, such as with one or more fasteners or by insertion into an opening. For instance, the second end plate 162 may be received in an opening or pocket disposed proximate the mounting portion 154 as shown with hidden lines in FIG. 7.

Referring to FIG. 9, an inner fender structure 150 is shown in an exemplary deformed condition. Deformation of the arm portion 156 may be facilitated when the tunable member 158 is deformed and may be inhibited when the tunable member 158 is not deformed. As such, the arm portion 156 and tunable member 158 may cooperate to absorb energy. Deformation of the tunable member 158 may be affected by its strength characteristics. For example, the tunable member 158 may have lower distortion resistance proximate a pre-weakened area 174.

The arm portion 156 may be configured to deform in a predetermined manner. For example, the first and second panels 164,166 and web panels 168 may cooperate with the tunable member 158 to fold back and forth when sufficient force is applied. As such, one or more web panels 168 may be configured to distort or fold relative to another web panel when an associated area of the tunable member 156 is deformed.

Figure 10:
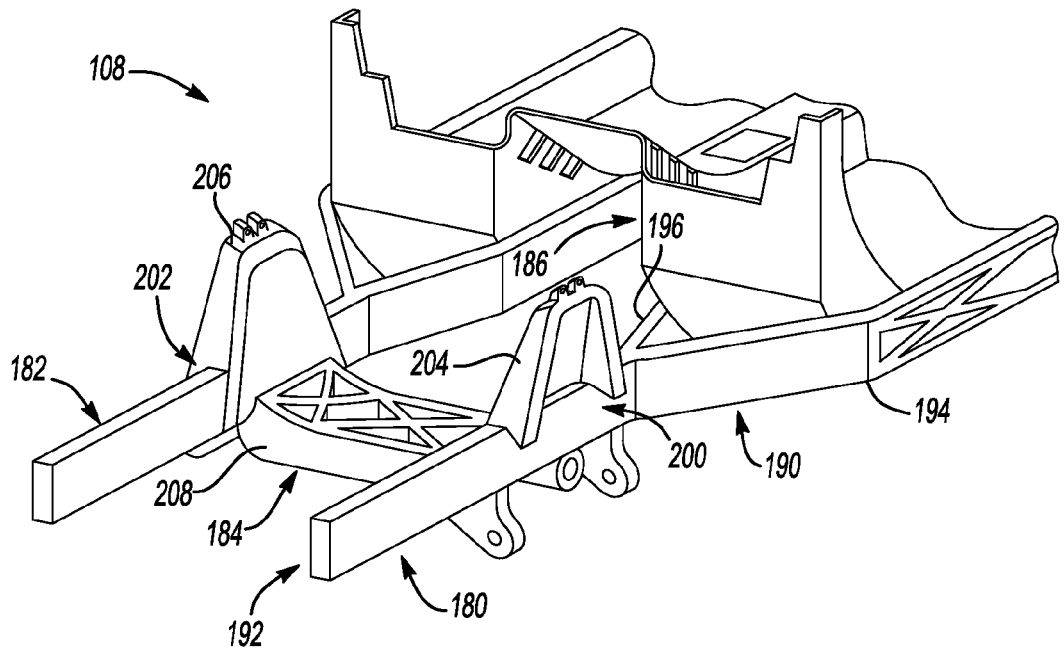
FIG. 10 is a perspective view of a first embodiment of an engine support structure.

Referring to FIG. 10, one embodiment of an engine support structure 108 is shown. The engine support structure 108 may include a first frame rail 180, a second frame rail 182, and a cradle 184.

The first and second frame rails 180,182 may extend from at least one vehicle body structure component. In at least one embodiment, the first and second frame rails 180,182 may be spaced apart and extend generally parallel to each other. In addition, the first and second frame rails 180,182 may at least partially define a tunnel or passage 186 into which various components, such as a transmission, drive shaft, or conduits may extend.

The first and second frame rails 180,182 may have similar configurations. For instance, the first and second frame rails 180,182 may have the same configuration or may be configured as mirror images of each other. For brevity, the first frame rail 180 will be described in detail below with the understanding that the second frame rail 182 may have similar attributes.

The first frame rail 180 may have a first end portion 190 and a second end portion 192 disposed opposite the first end portion. The first end portion 190 may be mounted to a portion of the vehicle body structure in any suitable manner, such as with interlocking mating features and/or fasteners. In addition, the first end portion 190 may include a plurality of branches, such as first and second branches 194,196. The first and second branches 194,196 may be spaced apart and may help reinforce a portion of the vehicle body structure. For instance, at least one of the first and second branches 194,196 may extend between multiple zones as shown in FIG. 3 in one or more embodiments of the present invention.

The second end portion 192 may extend into the engine compartment 22. The second end portion 192 may engage another vehicle body structure component, such as the front end structure 102 as represented in FIG. 2, or may be spaced apart from the front end structure 102 in a cantilever arrangement as is represented in FIG. 4.

The cradle 184 may be disposed on the first and second frame rails 180,182. In the embodiment shown in FIG. 10, the cradle 184 includes first and second sets of apertures 200,202 disposed proximate opposite sides of the cradle 184 that receive the first and second frame rails 180,182, respectively. The members of the sets of apertures may have any suitable configuration, such as holes or open sided slots as is shown in FIG. 10.

Figure 11:
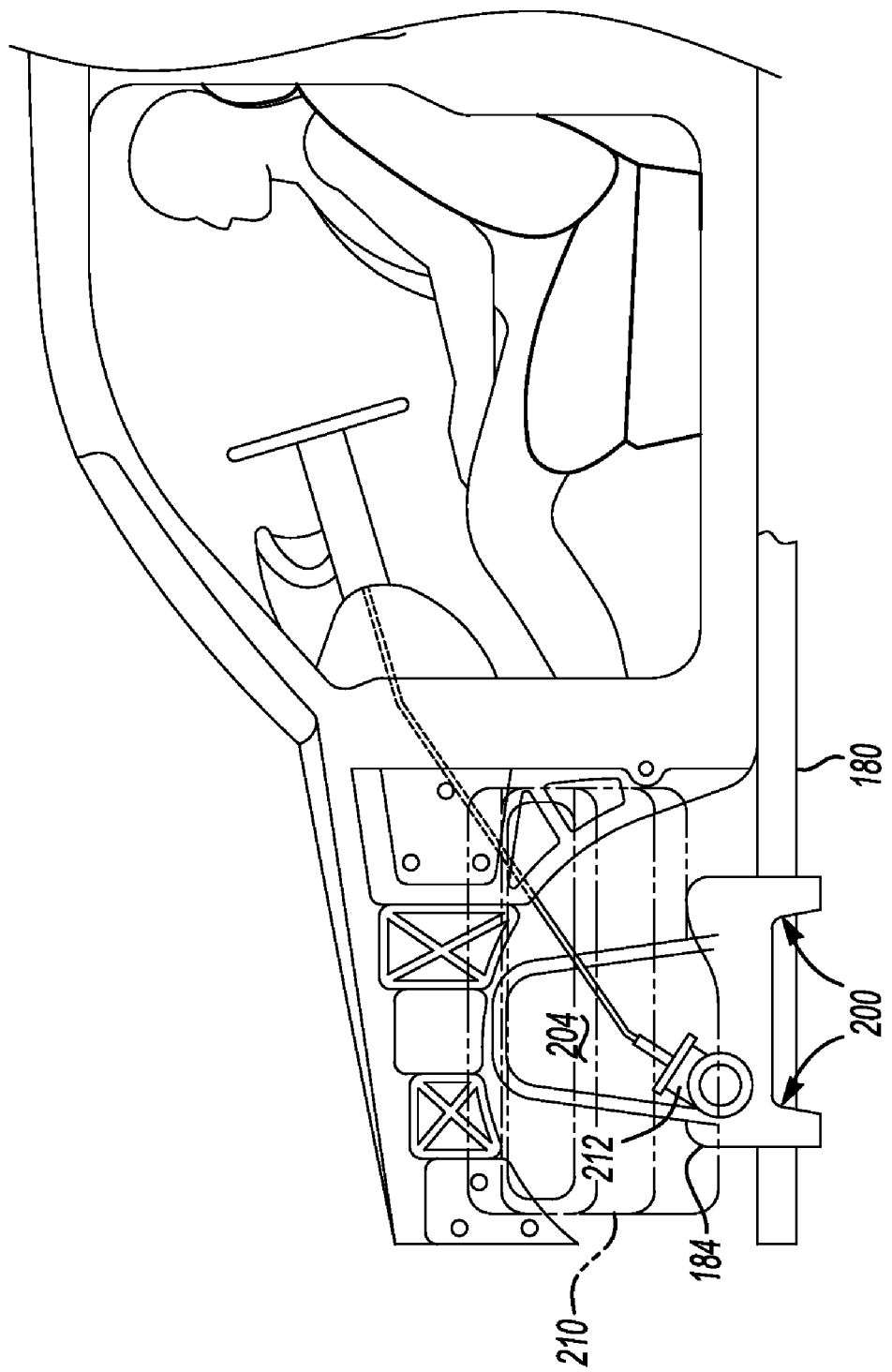
FIG. 11 is a side view of an engine support structure disposed in the vehicle.

The cradle 184 may also include first and second side portions 204,206 that generally extend above and/or between the members of the first and second sets of apertures 200,202, respectively. A bridge 208 may extend between the first and second side portions 204,206. The bridge 208 and/or first and second side portions 204,206 may cooperate to support an engine 210, as shown in phantom in FIG. 11. In addition, the first and second side portions 204,206 may be attached to opposing first and second inner fender structures to provide additional structural support. In addition, the cradle 184 may be configured to receive or support a steering system component 212, such as a shaft or steering gear. Like other vehicle body structure components, the cradle 184 may be provided as a one piece casting. In the embodiment shown, the steering system component is generally disposed toward the front of the cradle; however, invention also contemplates that a steering system component may be disposed in any suitable location such as toward the rear side of the cradle.

Figure 12:
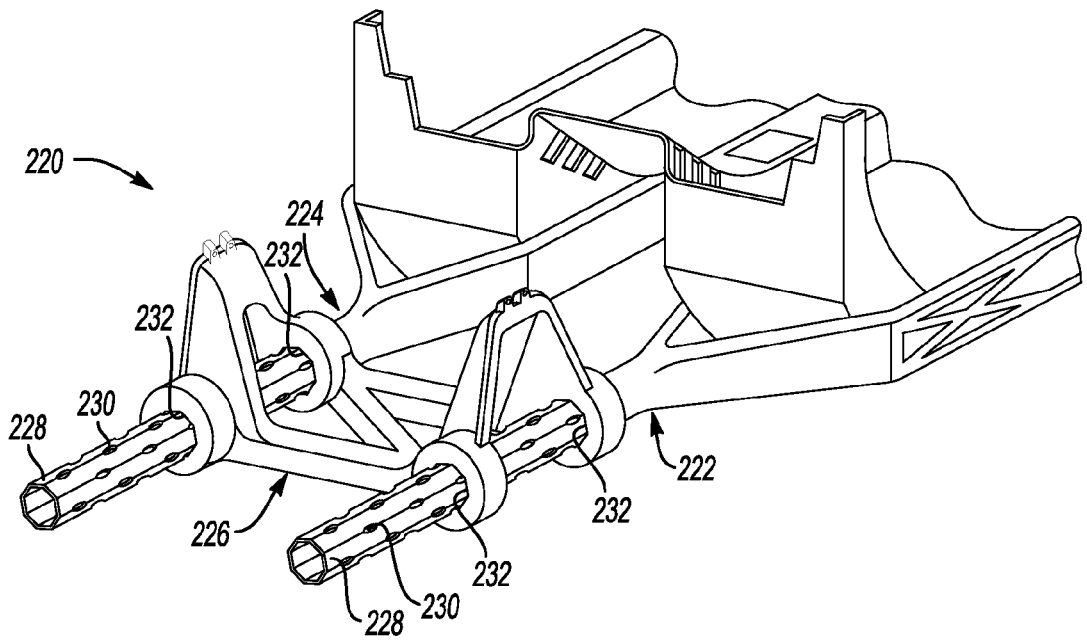
FIG. 12 is a perspective view of a second embodiment of an engine support structure.

Referring to FIG. 12, another embodiment of an engine support structure 220 is shown. The engine support structure may include first and second frame rails 222,224 and a cradle 226.

The first and second frame rails 222,224 may include a plurality of exterior surfaces 228 and a plurality of pre-weakened areas 230. The pre-weakened areas 230 may be provided in any suitable manner. For example, the pre-weakened areas 230 may be provided as a plurality of indentations or holes that may be spaced apart from each other and may extend at least partially through the frame rails 222,224. For example, the pre-weakened areas 230 may be spaced between the ends of each frame rail 222,224. The pre-weakened areas 230 may configure the frame rails 222,224 to distort in a predetermined manner when sufficient force is applied as will be discussed in more detail below. In addition, the frame rails 222,224 may be configured such that different areas deform at different load thresholds.

The cradle 226 may have similar features as the cradle 184 shown in FIG. 10. In the embodiment shown in FIG. 12, the cradle 226 has apertures 232 configured as through holes. In addition, one or more surfaces of the aperture 232 may mate with a frame rail to help position the cradle 226.

The engine support structures 108,220 described above may help protect a vehicle occupant during a vehicle impact event. The frame rails may distort between the cradle and frame rail end portions to absorb impact energy. In addition, the frame rails 222,224 may have increasing resistance to deformation and/or axial strength in the direction extending from the second end toward the first end to provide desired deformation characteristics. In at least one embodiment, the frame rails may distort between the cradle apertures in an area generally underneath an engine, thereby providing increased area or distance for absorbing energy.

Figure 13:
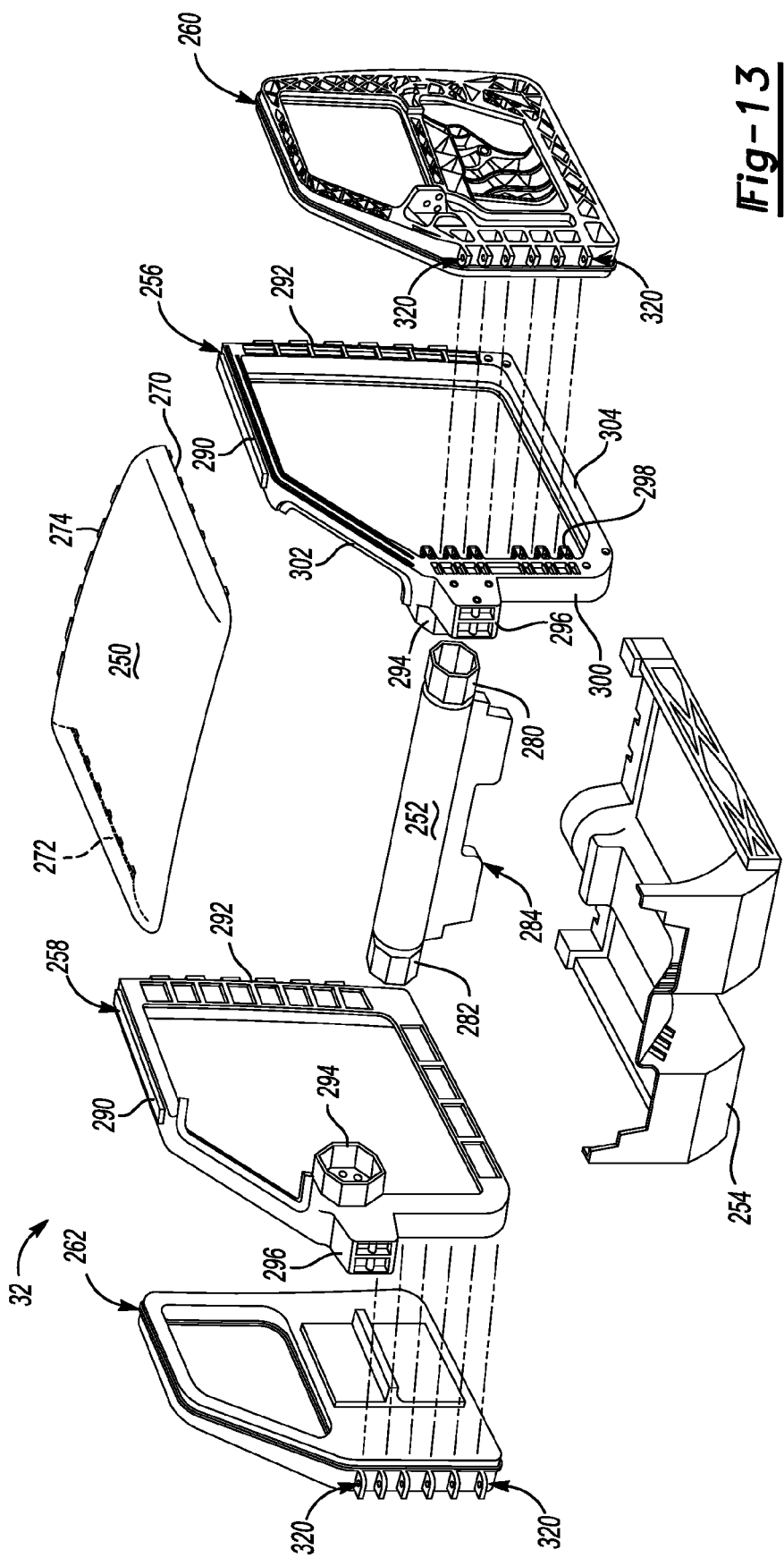
FIG. 13 is an exploded perspective view of a second zone of the vehicle.
Figure 14:
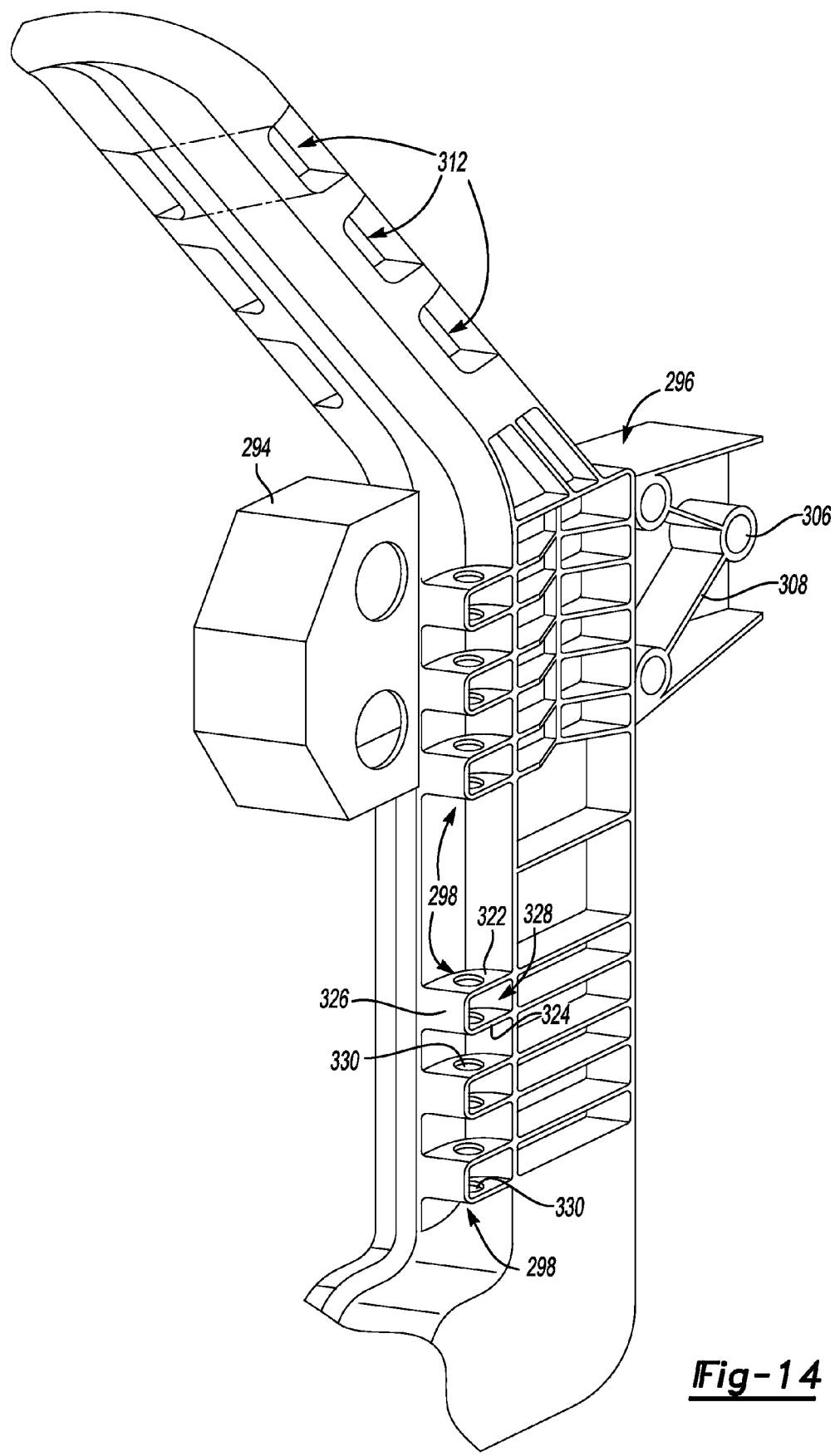
FIG. 14 is a fragmentary perspective view of a portion of a closure frame structure.

Referring to FIGS. 13 and 14 an exemplary second zone 32 is shown. For clarity, the second zone 32 is shown without body panels to more clearly depict the underlying portion of the vehicle body structure 14. The second zone 32 may at least partially define a passenger compartment 24 of the vehicle 10, such as a front portion disposed proximate the first zone 30. The second zone 32 may include a roof structure 250, a cowl structure 252, a first floor structure 254, a first closure frame structure 256, a second closure frame structure 258, a first closure structure 260, and a second closure structure 262.

The roof structure 250 may at least partially define a roof of the vehicle 10. For example, the roof structure 250 may extend between the first and second closure structures 256, 258. The roof structure 250 may receive one or more body panels and may include a sunroof or moonroof opening in one or more embodiments of the present invention.

The roof structure 250 may include a plurality of mating features that engage or interlock with another vehicle body structure component. For instance, the roof structure 250 may include first and second sets of roof mating features 270,272 that engage or interlock with the first and second closure structures 256,258, respectively. The first and second sets of roof mating features 270,272 may be disposed on a surface of the roof structure 250 that faces the passenger compartment 24. The roof structure 250 may also include a third set of roof mating features 274 that engage or interlock with a vehicle body structure component disposed in an adjacent zone, such as the third zone 34. In at least one embodiment, the third set of roof mating features 274 may be disposed along a rear surface of the roof structure 250. The mating features 270, 272,274 may have any suitable configuration as will be discussed in more detail below.

The cowl structure 252 may at least partially separate the engine compartment 22 from the passenger compartment 24. The cowl structure 252 may be disposed between the first and second closure frame structures 256,258 and may be configured to receive an instrument panel and carry structural loads.

The cowl structure 252 may include various mating features that engage or interlock with another vehicle body structure component. In at least one embodiment, the cowl structure 252 may include first and second end mating features 280,282 that engage or interlock with the first and second closure frame structures 256,258, respectively. The cowl structure 252 may also include mating features that engage or interlock with the first floor structure 254. For instance, the cowl structure 252 may include a mating region 284 that engages the first floor structure 254. The mating region 284 may have any suitable configuration and may overlap or include male and/or female features, like a tongue and groove arrangement, to inhibit leakage of fluids or gases. The cowl structure 252 may include elongated portions that extend downwardly to engage the first floor structure 254. The elongated portions may be generally disposed in front of left and right occupant seating positions and may be generally symmetrical to accommodate left and right hand drive configurations in which the driver is positioned in left or right side seating positions, respectively.

The first floor structure 254 may at least partially define a floor of the passenger compartment 24. The first floor structure 254 may be disposed proximate or may be mounted to the first and second closure structures 256,258 and the cowl structure 252. Additional features of the first floor structure 254 and other lower portion 20 components will be discussed in more detail below.

The first and second closure frame structures 256,258 may be disposed on opposite sides of the vehicle 10. Each closure frame structure 256,258 may at least partially define an opening that receives a closure structure. In the embodiment shown, the first and second closure frame structures 256,258 each extend around and define openings that may receive a closure structure.

The first and second closure frame structures 256,258 may include various features for mating with other vehicle body structure components. For example, the first and second closure frame structures 256,258 may each include an upper mating feature 290, a structure mating feature 292, a cowl mating feature 294, an inner fender mating feature 296, and a hinge portion 298. These mating features may be integrally formed with their respective closure frame structures.

The upper mating features 290 of the first and second closure frame structures 256,258 may engage or interlock with the first and second roof mating features 270,272, respectively. The upper mating features 290 may have any suitable configuration that is compatible with the first and second roof mating features 270,272.

At least one structure mating feature 292 may be provided that engages or interlocks with a vehicle body structure component disposed in an adjacent zone, such as the third zone 34. In at least one embodiment, the structure mating features 292 may be disposed along a rear surface of the closure frame structures 256,258 and may have any suitable configuration as will be discussed in more detail below.

The cowl mating features 294 of the first and second closure frame structures 256,258 may engage or interlock with the first and second end mating features 280,282, respectively. Each cowl mating feature 294 may be disposed on a side of a closure frame structure that is disposed between the inner fender mating feature 296 and hinge portion 298. The cowl mating features 294 may also receive a portion of an instrument panel in one or more embodiments of the present invention.

Referring to FIGS. 13 and 14, the inner fender mating features 296 may extend from and be integrally formed with the closure frame structures 256,258. In at least one embodiment, an inner fender mating feature 296 may be disposed along a front surface 300 between an A pillar 302 and a bottom surface 304 of each closure frame structure 256,258. The inner fender mating features 296 may be configured as a tenon that may have a generally rectangular configuration and may extend across the front surface 300 to distribute load forces. At least one sleeve 306 may be provided for receiving a fastener. In addition, a reinforcing rib 308 may extend between one or more sleeves 306 to provide increased strength and distribute load forces. Optionally, the A pillar 302 may be provided with one or more through holes or openings 312 that provide visibility for a vehicle occupant by reducing visual obstructions.

Figure 15:
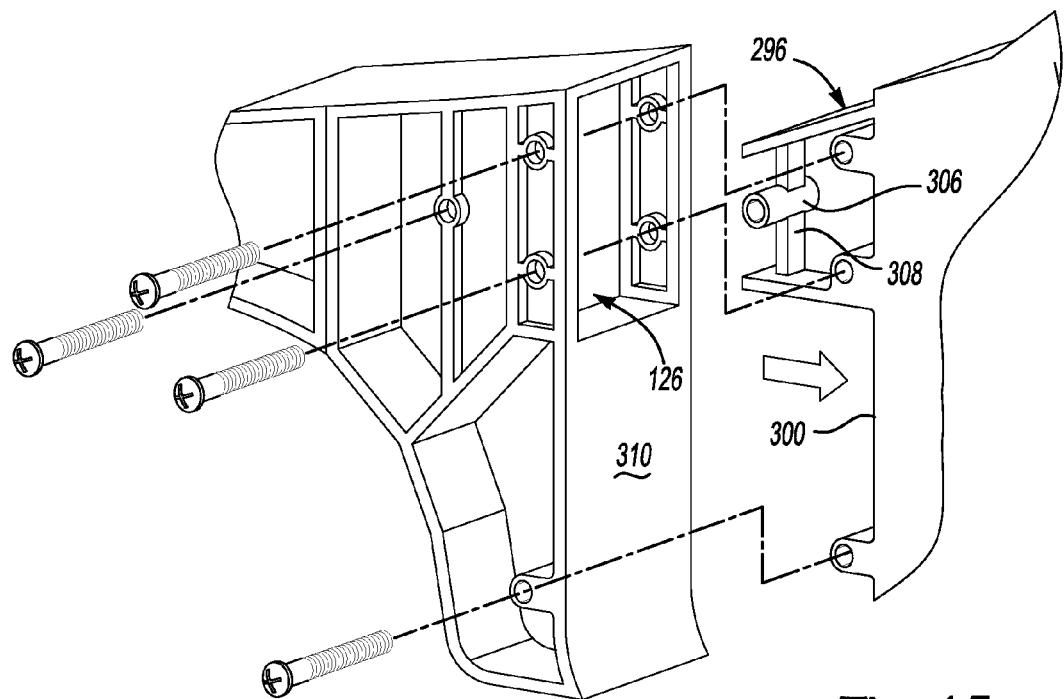
FIG. 15 is an exploded fragmentary perspective view of an interface between an inner fender structure and a closure frame structure.

Referring to FIG. 15, an exemplary connection between a closure frame structure and an inner fender structure is shown. Such a connection may be made without welding the closure frame structure to the inner fender structure. In the embodiment shown, a mating feature 126 configured as a mortise is provided with an inner fender structure and is configured to receive an inner fender mating feature 296 configured as a tenon. Such a configuration may provide a stable mounting configuration and may withstand high load forces, such as may be associated with a vehicle impact event. One or more fasteners may extend at least partially through the mating features 126,296 to further couple the inner fender structure and closure frame structure.

Other surfaces of the inner fender structure and closure frame structure may cooperate to help distribute load forces. For instance, the front surface 300 of the closure frame structure and back surface 310 of the inner fender structure may be disposed adjacent to each other and transfer load forces from the inner fender structure to the closure frame structure. Moreover, the front and back surfaces 300,310 may not be directly attached or welded to each other to facilitate removal or replacement of the inner fender structure. In at least one alternate embodiment, one or more additional fasteners may be located below the arm portion to further couple the inner fender structure to a closure frame structure.

Referring again to FIGS. 13 and 14, the first and second closure structures 260,262 may be pivotally disposed on the first and second closure frame structures 256,258, respectively. In at least one embodiment, the closure structures 260,262 may each include a closure hinge portion 320.

Figure 16:
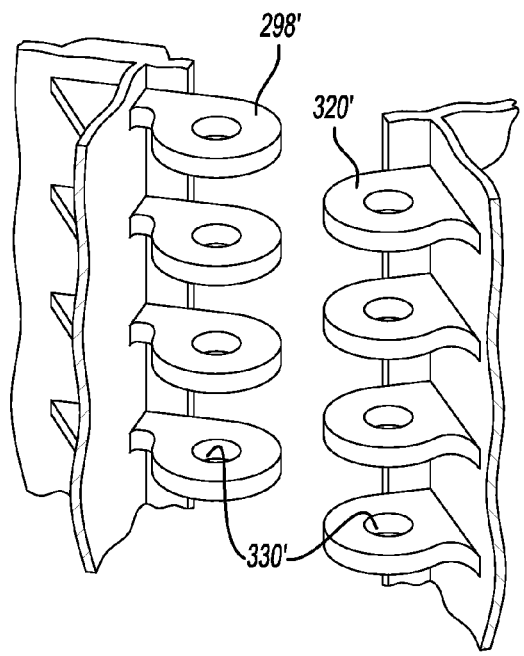
FIG. 16 is a fragmentary view of an embodiment of a closure hinge.

The closure frame hinge portions 298 and closure hinge portions 320 may have any suitable configuration. In the embodiment shown in FIGS. 13 and 14, the hinge portions 298,320 may be generally aligned with each other. Each hinge portion 298,320 may have an upper wall 322, a lower wall 324, and at least one side wall 326 that may cooperate to define a pocket 328. The upper and lower walls 322,324 may each have a hole 330. The holes 330 may generally be disposed along an axis. In at least one other embodiment, such as that shown in FIG. 16, closure frame and closure hinge portions 298',320' may have a single wall that includes a hole 330'.

Figure 17:
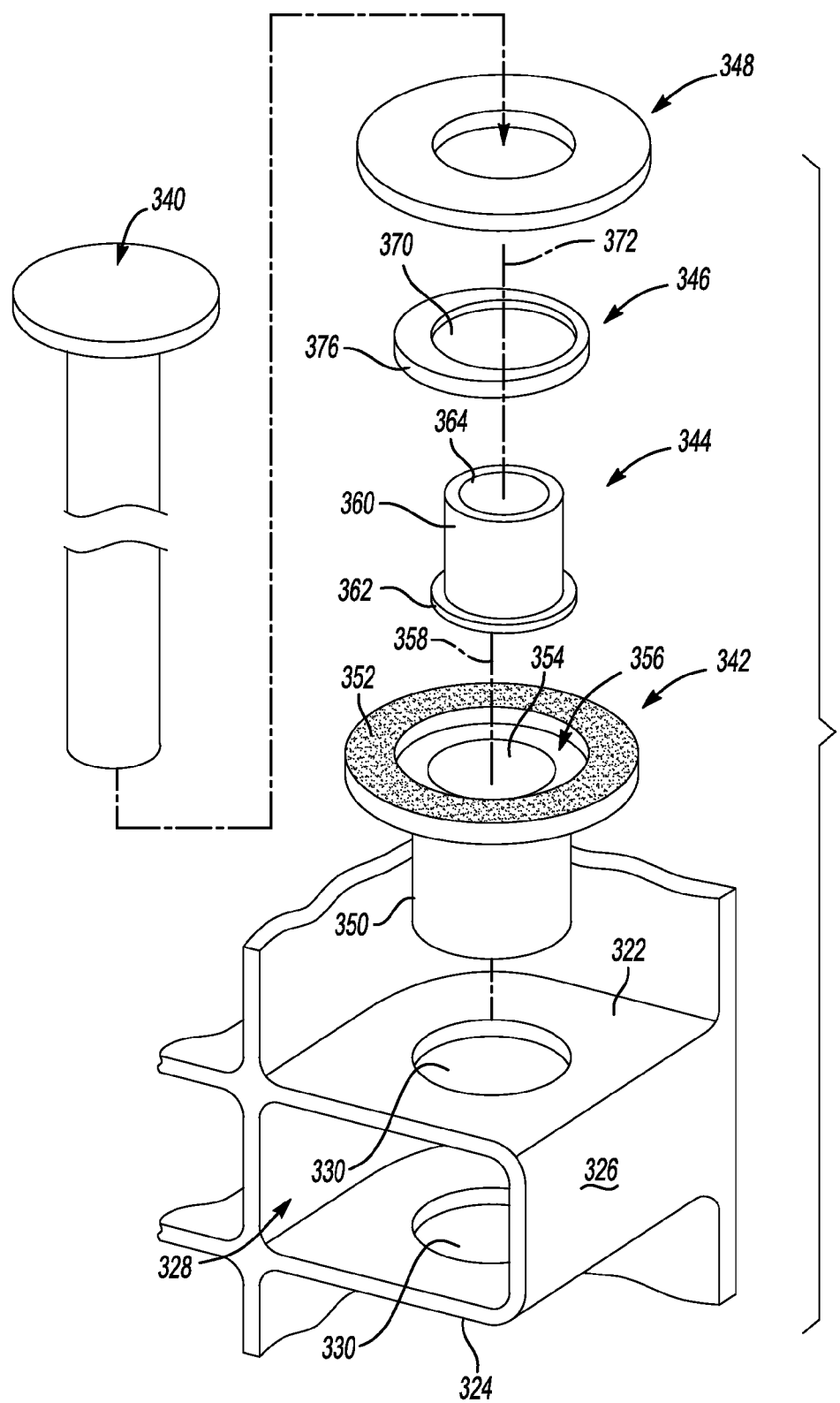
FIG. 17 is an exploded perspective view of another embodiment of a closure hinge.
Figure 18:
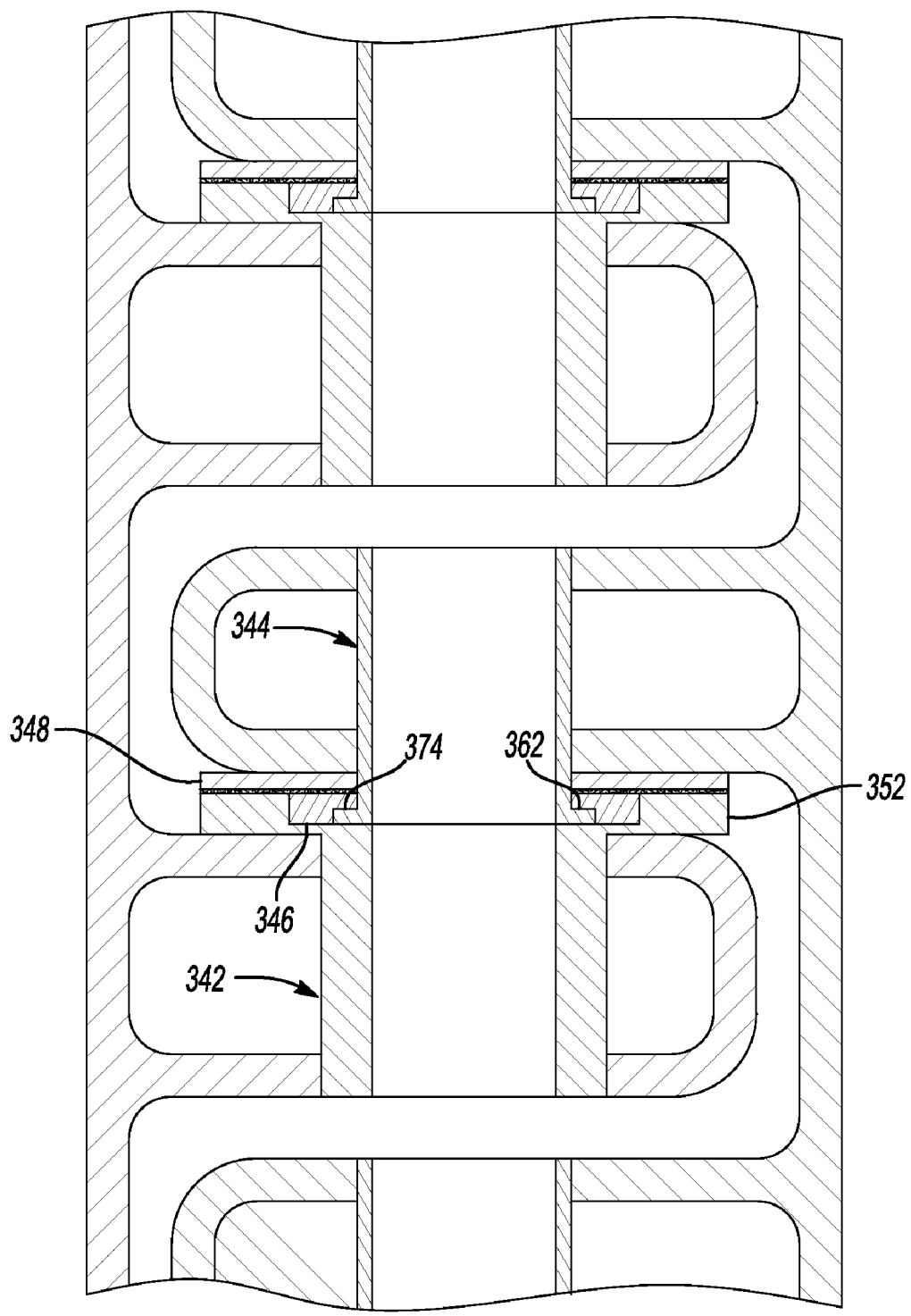
FIG. 18 is a section view of a portion of the closure hinge shown in FIG. 17.

Referring to FIGS. 17 and 18, an exemplary connection between the hinge portions 298,320 is shown. The connection may include various components that permit the hinge portions 298,320 to receive a hinge pin 340 and permit a closure structure to pivot with respect to a closure frame structure without binding. In FIG. 18, the hinge pin 340 is not shown for clarity. In addition to the hinge pin 340 the hinge portion connection components may include a first bushing 342, a second bushing 344, a shim 346, and a cover 348.

The first bushing 342 may be received by at least one hole 330. The first bushing 342 may include a body portion 350 and a flange portion 352 disposed proximate the body portion 350. The body portion 350 may have any suitable configuration. In the embodiment shown, the body portion 350 is generally cylindrical and includes a through hole 354 that may receive the hinge pin 340. The flange portion 352 may extend outwardly and may help position the first bushing 342 with respect to a hinge portion. The flange portion 352 may include a recess 356 that at least partially receives at least one other connection component as will be described in more detail below. In addition, the body and/or flange portions 350,352 may be disposed about a bushing axis 358.

The second bushing 344 may have a similar configuration as the first bushing 342. The second bushing 344 may include a body portion 360 and a flange portion 362. The body portion 360 may include a through hole 364 that receives the hinge pin 340. The flange portion 362 may engage the first bushing 342. In at least one embodiment, the flange portion 362 may be at least partially received in the recess 356.

The shim 346 may be disposed between the first and second bushings 342,344. In at least one embodiment, the shim 346 may be disposed in the recess 356 and may include a through hole 370. The through hole 370 may be disposed about a hole axis 372 that may be offset from the center of the shim 346 and may be offset from the bushing axis 358. In addition, the shim 346 may include a notch 374 that receives the flange portion 362 of the second bushing 344 as is best shown in FIG. 18. The through hole 370 may receive the second bushing 344 while a perimeter surface 376 of the shim 346 may engage the flange portion 352 or recess wall of the first bushing 342. As such, the shim 346 may facilitate alignment of the first and second bushings 342,344. For example, the shim 346 may be rotated with respect to the first bushing 342 to adjust the position of the second bushing 344, thereby helping to align the bushings 342,344 and accommodate misalignment of the holes 330. Shims may be provided in one or more sizes (e.g., thicknesses and/or through hole locations) to accommodate different adjustment needs.

The cover 348 may be disposed proximate the first bushing 342 and may help hold the second bushing 344 and/or shim 346 adjacent to the first bushing 342. The cover 348 may have any suitable configuration. For example, the cover 348 may include a hook and loop fastener that facilitates attachment to the first bushing 342 and may accommodate rotation of the shim 346 and repositioning of the second bushing 344.

Referring to FIGS. 19-22 various embodiments of exemplary third zones 34 are shown. These embodiments may at least partially define a passenger compartment 24 of the vehicle 10, such as an intermediate or rear portion disposed adjacent to the second zone 32.

Figure 19:
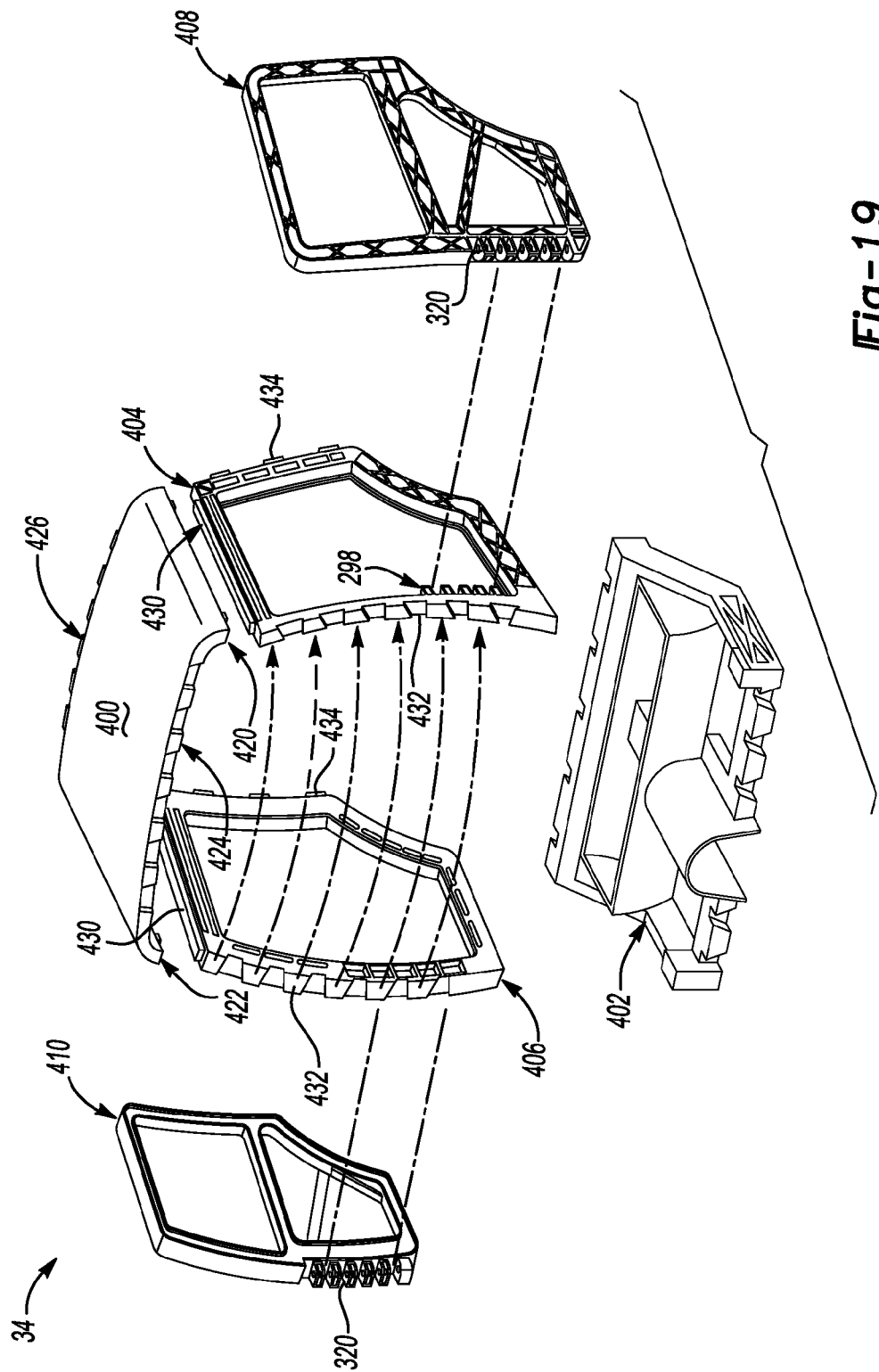
FIGS. 19-22 are exploded perspective views of various embodiments of a third zone of the vehicle.

Referring to FIG. 19, a first embodiment of a third zone 34 is shown. This embodiment may be representative of a four door vehicle configuration. The third zone 34 may include a roof structure 400, a second floor structure 402, a first closure frame structure 404, a second closure frame structure 406, a first closure structure 408, and a second closure structure 410.

The roof structure 400 may at least partially define a roof of the vehicle 10. For example, the roof structure 400 may extend between the first and second closure structures 404, 406. The roof structure 400 may receive one or more body panels and may include a sunroof or moonroof opening in one or more embodiments of the present invention.

The roof structure 400 may include a plurality of mating features that engage or interlock with another vehicle body structure component. For instance, the roof structure 400 may include first and second sets of roof mating features 420,422 that engage or interlock with the first and second closure structures 404,406, respectively. The first and second sets of roof mating features may be disposed on a surface of the roof structure 400 that faces the passenger compartment 24. The roof structure 400 may also include a third and fourth sets of roof mating features 424,426 that engage or interlock with a vehicle body structure component disposed in an adjacent zone, such as the second and fourth zones 32,36, respectively. In at least one embodiment, the third and fourth sets of roof mating features 424,426 may be disposed along a front and rear surfaces of the roof structure 400, respectively. The mating features 420,422,424,426 may have any suitable configuration as will be discussed in more detail below.

The second floor structure 402 may at least partially define a floor of the passenger compartment 24. The second floor structure 402 may be disposed proximate or may be mounted to the first and second closure structures 404,406. Additional features of the second floor structure 402 and other lower portion 20 components will be discussed in more detail below.

The first and second closure frame structures 404,406 may be disposed on opposite sides of the vehicle 10. Each closure frame structure 404,406 may at least partially define an opening that receives a closure structure. The first and second closure frame structures 404,406 may include various features for mating with other vehicle body structure components. For example, the first and second closure frame structures 404,406 may each include hinge portions 298, an upper mating feature 430, and first and second structure mating features 432,434. These mating features may be integrally formed with their respective closure frame structures in one or more embodiments of the present invention.

The upper mating features 430 of the first and second closure frame structures 404,406 may engage or interlock with the first and second roof mating features 420,422, respectively. The upper mating features 430 may have any suitable configuration that is compatible with the first and second roof mating features 420,422.

The first and second structure mating features 432,434 may engage or interlock with vehicle body structure components disposed in adjacent zones, such as the second and fourth zones 32,36, respectively. In at least one embodiment, the structure mating features 432,434 may be disposed along front and rear surfaces of the closure frame structures 404, 406, respectively, and may have any suitable configuration as will be discussed in more detail below.

The first and second closure structures 408,410 may be pivotally disposed on the first and second closure frame structures 404,406, respectively. The closure structures 408,410 may have a configuration similar to closure structures 260 and 262. As such, each closure structure 408,410 may each include a closure hinge portion 320 as previously described.

Figure 20:
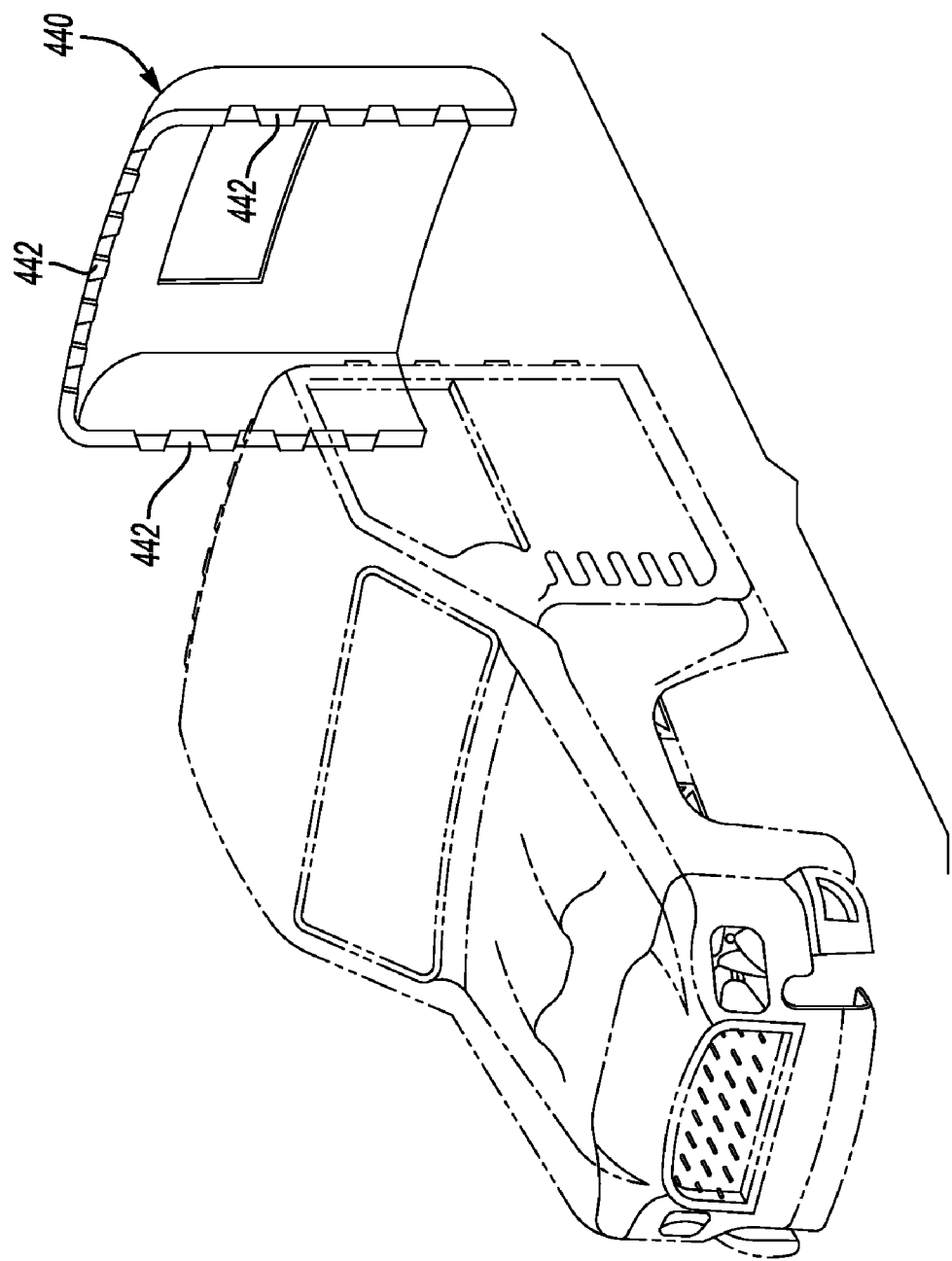

Referring to FIG. 20, a second embodiment of a third zone is shown. This embodiment may be representative of a regular cab pickup configuration and may include a rear structure 440 that may include a plurality of mating features 442 that engage vehicle body structure components associated with the second zone 32. In at least one embodiment, the mating features 442 may face toward the front of the vehicle for engaging the roof structure 250 and first and second closure frame structures 256,258 of the second zone 32. For example, one or more mating features 442 may engage or interlock with third set of roof mating features 274 and the structure mating features 292. In addition, one or more mating features 442 may be adapted to engage part of the lower portion 20, such as the first floor structure 254 in one or more embodiments of the present invention. In FIG. 20, the second floor structure 402 is not shown for clarity.

Figure 21:
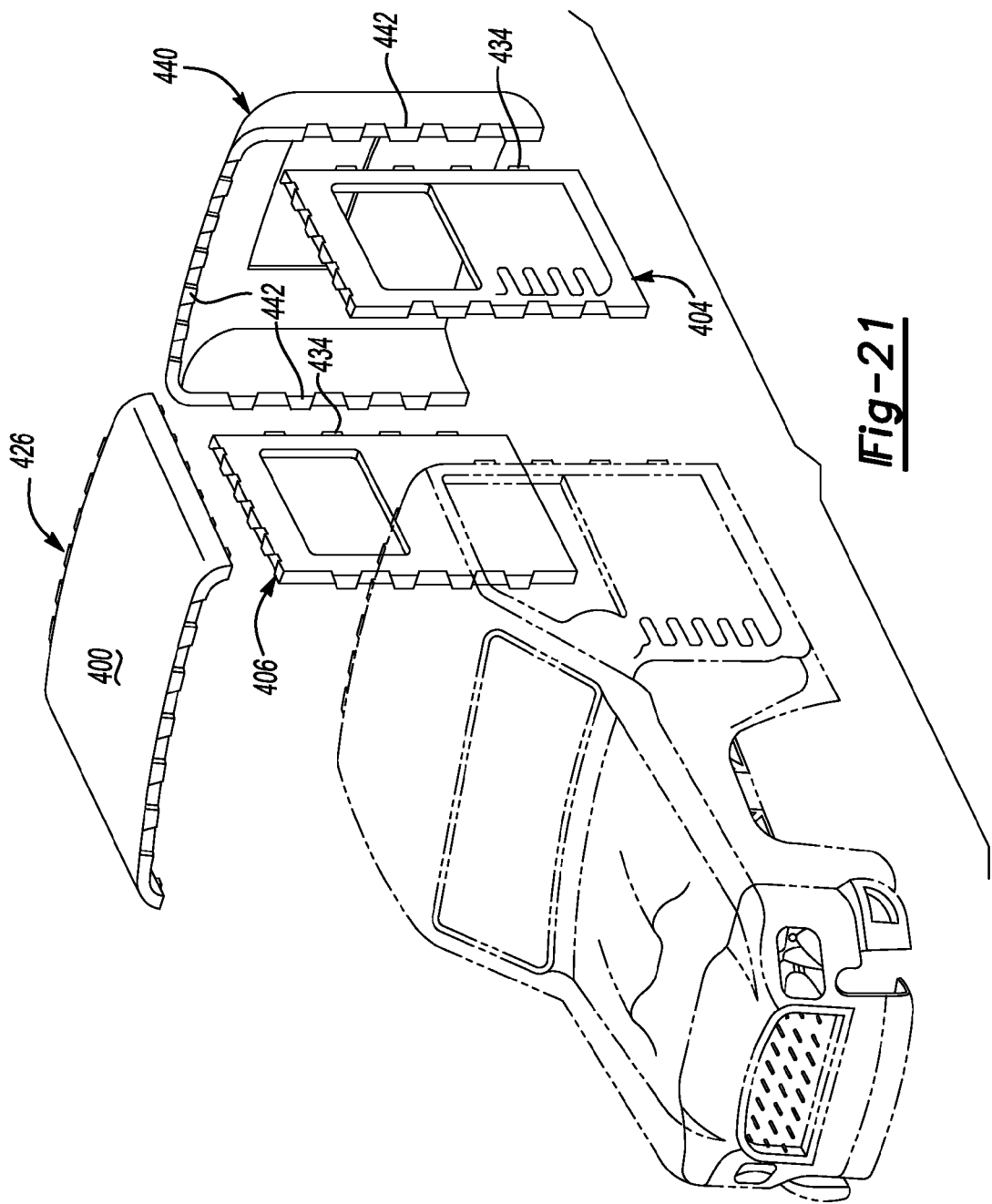

Referring to FIG. 21, a third embodiment of a third zone is shown. This embodiment may be representative of an extended cab pickup configuration having at least one closure. The third embodiment may be provided by combining the roof structure 400, a second floor structure 402, and components similar to the closure frame structures 404,406, and closure structures 408,410 with the rear structure 440 of FIG. 20. For example, the rear structure mating features 442 may engage or interlock with the fourth set of roof mating features 426 and structure mating features 434. In FIG. 21, the second floor structure 402 is not shown for clarity.

Figure 22:
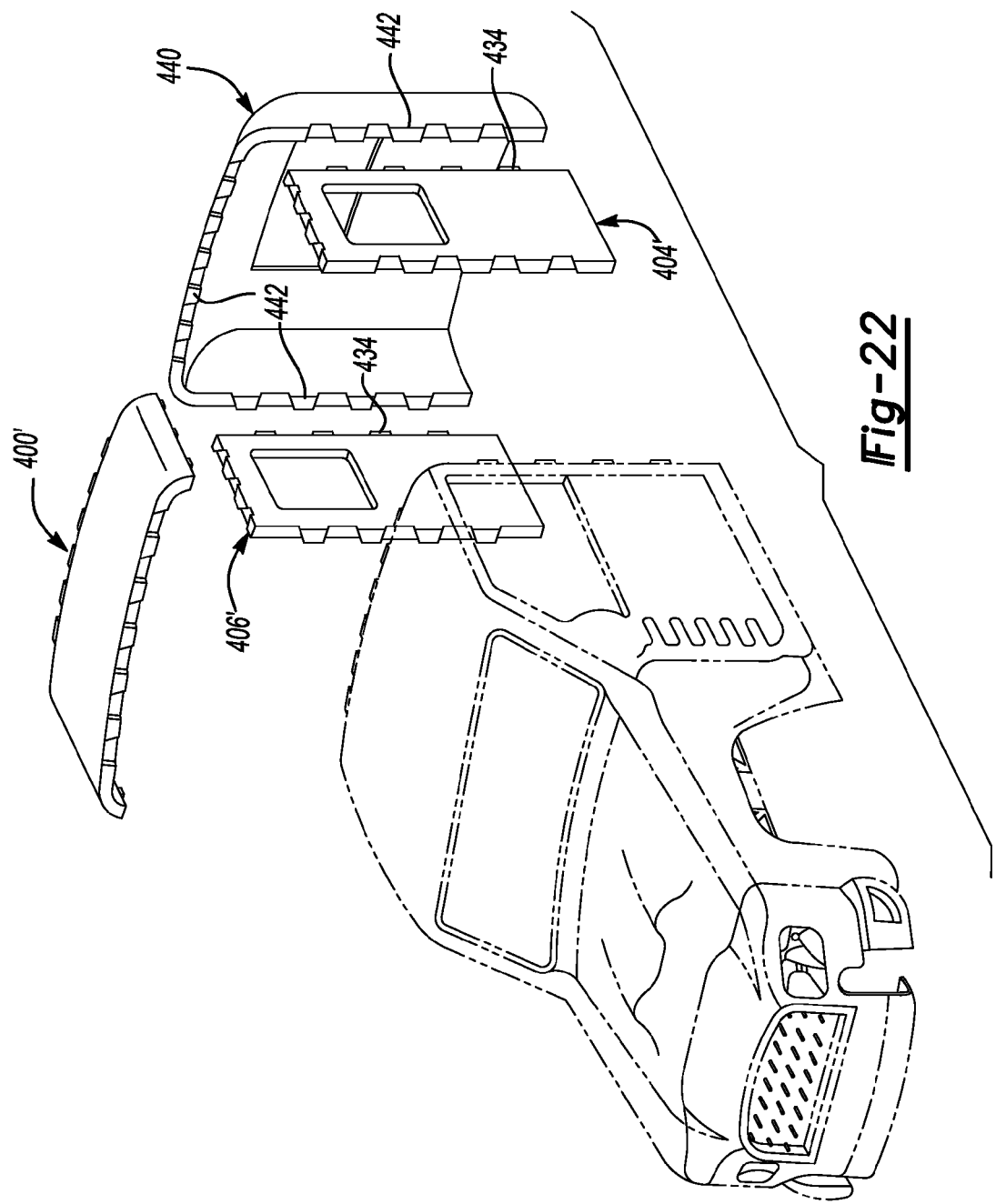

Referring to FIG. 22, a fourth embodiment of a third zone is shown. This embodiment may be representative of an extended cab pickup configuration. The fourth embodiment may be provided by combining a roof structure 400', a second floor structure 402, and side frame structures 404',406' with the rear structure 440. In FIG. 22, the second floor structure 402 is not shown for clarity. At least one of the side frame structures 404',406' may not include a closure opening in one or more embodiments of the present invention.

Referring to FIGS. 23-26 various embodiments of exemplary fourth zones 36 are shown. These embodiments may at least partially define a rear portion of the vehicle 10.

Figure 23:
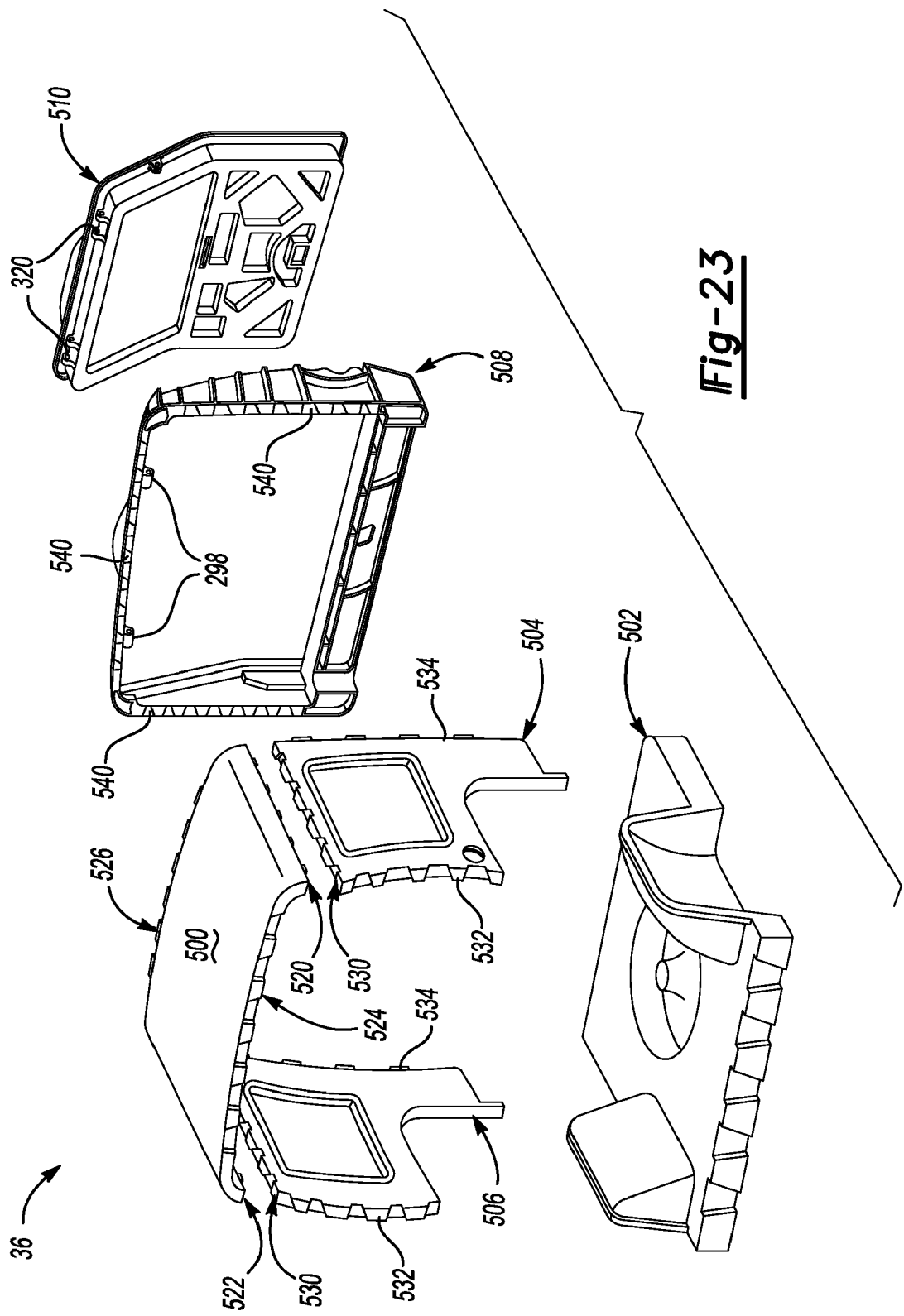
FIGS. 23-26 are exploded perspective views of various embodiments of a fourth zone of the vehicle.

Referring to FIG. 23, a first embodiment of a fourth zone 36 is shown. This embodiment may be representative of a van, sport utility, or hatchback vehicle configuration. The fourth zone 36 may include a roof structure 500, a third floor structure 502, a first side structure 504, a second side structure 506, a rear structure 508, and a rear closure structure 510.

The roof structure 500 may at least partially define a roof of the vehicle 10 and may extend between the first and second side structures 502,504. The roof structure 500 may include a plurality of mating features that engage or interlock with another vehicle body structure component. For instance, the roof structure 500 may include first and second sets of roof mating features 520,522 that engage or interlock with the first and second side structures 504,506, respectively. The roof structure 500 may also include a third and fourth sets of roof mating features 524,526 that engage or interlock with a vehicle body structure component. In at least one embodiment, the third and fourth sets of roof mating features 524,526 may be disposed along a front and rear surfaces of the roof structure 500, respectively. The mating features 520,522,524, 526 may have any suitable configuration as will be discussed in more detail below.

The third floor structure 502 may be disposed proximate various structural components, such as the first and second closure structures 504,506 and/or the rear structure 508. Additional features of the third floor structure 502 will be discussed in more detail below.

The first and second side structures 504,506 may be disposed on opposite sides of the vehicle 10. Each side structure 504,506 may be provided with or without window openings. The first and second side structures 504,506 may include various features for mating with other vehicle body structure components. For example, the first and second side structures 504,506 may each include an upper mating feature 530 and first and second structure mating features 532,534. These mating features may be integrally formed with the side structures.

The upper mating features 530 of the first and second side structures 504,506 may engage or interlock with the first and second roof mating features 520,522, respectively. The upper mating features 530 may have any suitable configuration that is compatible with the first and second roof mating features 520,522. These mating features may be integrally formed with the side structures.

The first and second structure mating features 532,534 may engage or interlock with a vehicle body structure component. These mating features may be integrally formed with the side structures. In at least one embodiment, the structure mating features 532,534 may be disposed along front and rear surfaces of the side structures 520,522, respectively, and may have any suitable configuration as will be discussed in more detail below.

The rear structure 508 may include various features for mating with other vehicle body structure components. For example, the rear structure 508 may include mating features 540 that engage or interlock with the fourth set of roof mating features 526 and/or structure mating features 534. In addition, the rear structure 508 may also include mating features that engage or interlock with the third floor structure 502. The rear structure 508 may also include hinge portions 298 that facilitate pivotal attachment of the rear closure structure 510. The hinge portions 298 may be disposed proximate any side of an opening 542 provided in the rear structure 508 to accommodate various closure structure configurations and/or pivotal window attachments.

The rear closure structure 510 may be pivotally disposed on the rear structure 508. The rear closure structure 510 may have any suitable configuration, such as a liftgate or one or more doors. In at least one embodiment, the rear closure structure 510 may include a closure hinge portion 320.

Figure 24:
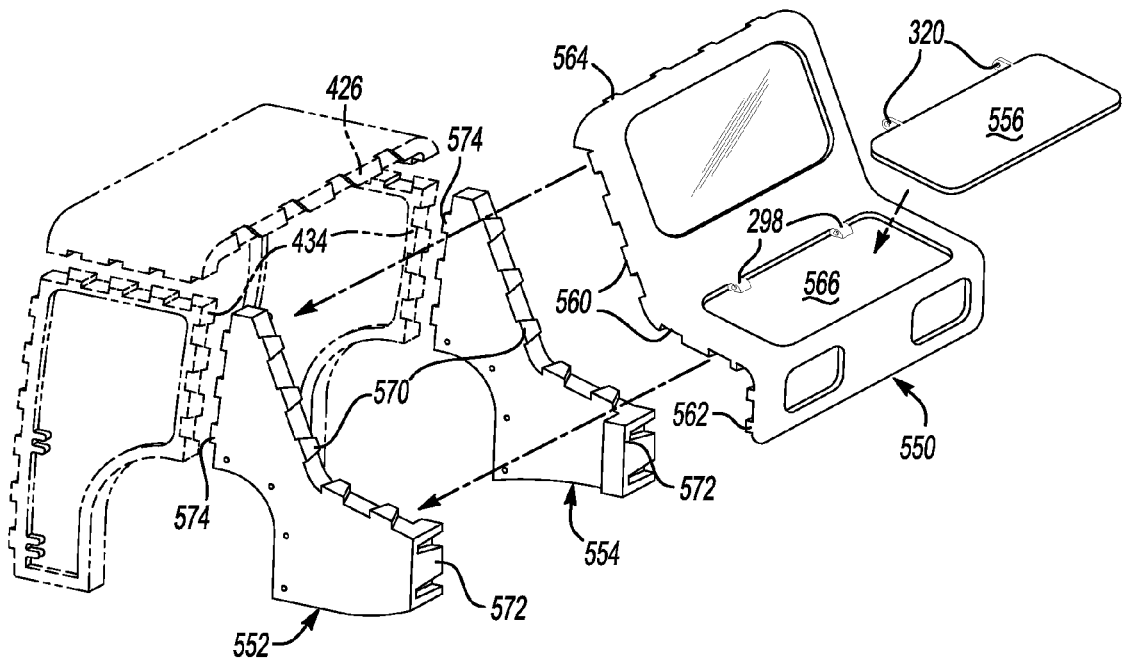

Referring to FIG. 24, a second embodiment of a fourth zone is shown. This embodiment may be representative of a sedan configuration and may include an upper structure 550, a first rear side structure 552, a second rear side structure 554, and a rear closure structure 556. This embodiment may also include the third floor structure 502, which is not shown for clarity.

The upper structure 550 may be provided proximate upper and/or rear surfaces of the vehicle 10. The upper structure 550 may include various features for mating with other vehicle body structure components. For example, the upper structure 550 may include first, second, and third sets of frontal mating features 560,562,564. In at least one embodiment, the first set of frontal mating features 564 may interlock with the fourth set of roof mating features 426. In addition, the upper structure 550 may include one or more hinge portions 298 disposed proximate an opening 566 to facilitate pivotal mounting of the rear closure structure 556.

The first and second rear side structures 552,554 may be disposed on opposite sides of the vehicle 10. The first and second rear side structures 552,554 may include various features for mating with other vehicle body structure components. For example, the first and second side structures 552, 554 may each include first and second sets of upper mating features 570,572 and a set of passenger compartment mating features 574. These mating features may be integrally formed with the side structures.

The first and second sets of upper mating features 570,572 may engage or interlock with the first and second sets of frontal mating features 560,562, respectively. The upper mating features 570,572 may have any suitable configuration that is compatible with the first and second frontal mating features 560,562. In at least one embodiment, the first and second sets of upper mating features 570,572 may generally be disposed along upper surfaces of the first and second side structures 552,554.

The passenger compartment mating features 574 may engage or interlock with a vehicle body structure component. In at least one embodiment, the passenger compartment mating features 574 may be disposed along front surfaces of the first and second side structures 552,554 and may interlock with structure mating features 434. The passenger compartment mating features 574 may have any suitable configuration as will be discussed in more detail below.

The rear closure structure 556 may be pivotally disposed on the upper structure 550. The rear closure structure 556 may have any suitable configuration, such as a trunk lid. In at least one embodiment, the rear closure structure 556 may include a closure hinge portion 320 and a hinge connection as previously described.

Figure 25:
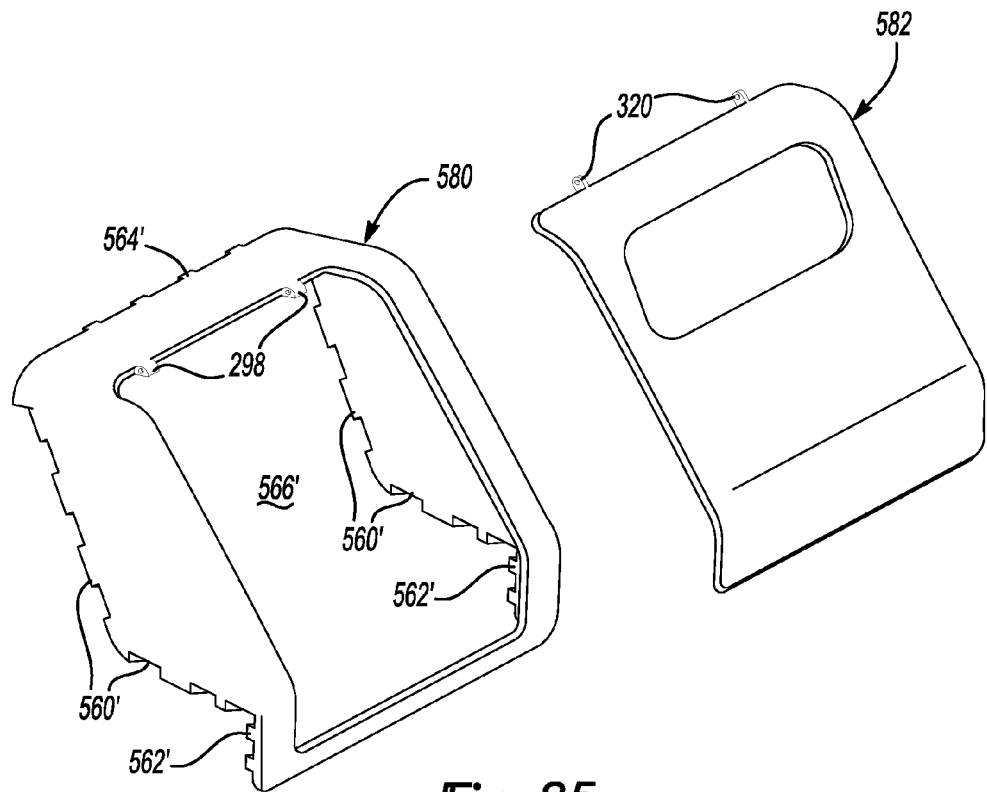

Referring to FIG. 25, a third embodiment of a fourth zone is shown. This embodiment may be representative of a hatchback configuration and may include an upper structure 580 and a rear closure structure 582. This embodiment may also include the third floor structure 502, which is not shown for clarity.

The upper structure 580 may include various features for mating with other vehicle body structure components. For example, the upper structure 580 may include first, second, and third sets of frontal mating features 560',562',564'. In at least one embodiment, the first and second sets of frontal mating features 560',562' may engage or interlock with the first and second sets of upper mating features 570,572 while the third set of frontal mating features 564' may interlock with the fourth set of roof mating features 426. In addition, the upper structure 580 may include one or more hinge portions 298 disposed proximate an opening 566' to facilitate pivotal mounting of the rear closure structure 582.

The rear closure structure 582 may be pivotally disposed on the upper structure 580. The rear closure structure 582 may have any suitable configuration, such as a hatchback lid. In at least one embodiment, the rear closure structure 582 may include a closure hinge portion 320 and a hinge connection as previously described.

Figure 26:
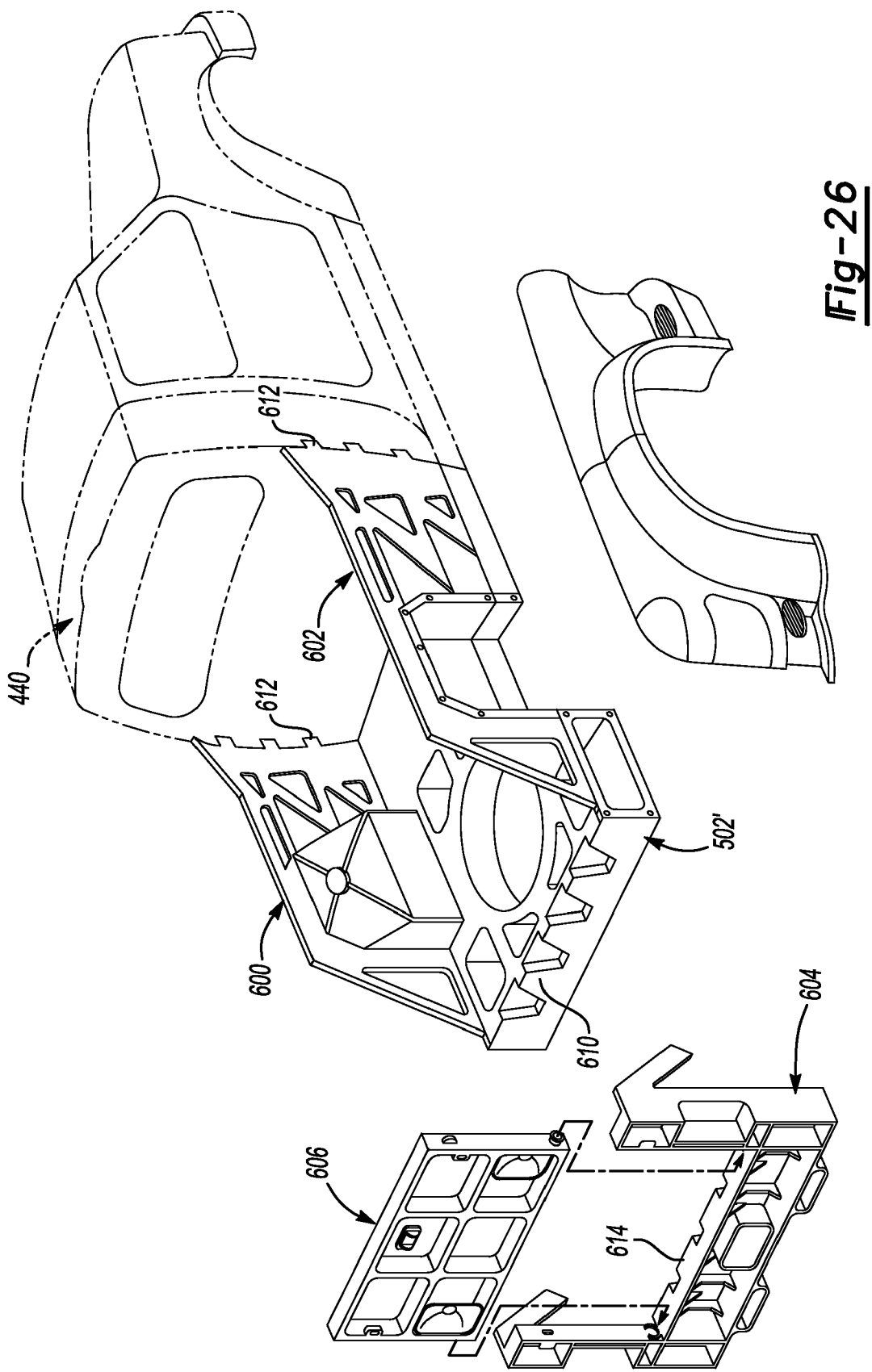

Referring to FIG. 26, a fourth embodiment of a fourth zone is shown. This embodiment may be representative of a pickup truck configuration and may include the third floor structure 502', first rear side structure 600, a second rear side structure 602, a rear structure 604, and a rear closure structure 606.

The third floor structure 502' may be disposed proximate various structural components, such as the first and second rear side structures 602,604 and rear structure 608. In the embodiment shown, the third floor structure 502' is configured as variation of the third floor structure 502. For example, the third floor structure 502' may include a plurality of rear end mating features 610 that may engage the rear structure 604. It should be understood that either third floor structures 502,502' may be used in one or more embodiments of the present invention.

The first and second rear side structures 600,602 may be disposed on opposite sides of the vehicle 10. The first and second side structures 600,602 may include various features for mating with other vehicle body structure components. For example, the first and second side structures 600,602 may each include structure mating features 612 that may be integrally formed with the rear side structures 600,602. The structure mating features 612, if provided, may be disposed along front surfaces of the rear side structures 600,602, respectively. In at least one embodiment, the structure mating features 612 may engage or interlock with mating features associated with another zone, such as a rear structure 440, and may have any suitable configuration as will be discussed in more detail below. In addition, the first and second side structures 600, 602 may have mating features that interlock with the rear end structure 604 and/or third floor structure 502' in one or more embodiments of the present invention.

The rear structure 604 may include various features for mating with other vehicle body structure components. For example, the rear structure 604 may include mating features 614 that engage or interlock with the plurality of rear end mating features 610. In addition, the rear structure 604 may also include features that facilitate pivotal attachment of the rear closure structure 606.

The rear closure structure 606 may be pivotally disposed on the first and second rear side structures 600,602 or the rear structure 604 as shown in FIG. 26. The rear closure structure 606 may have any suitable configuration, such as a tailgate or side mounted closure.

Figure 27:
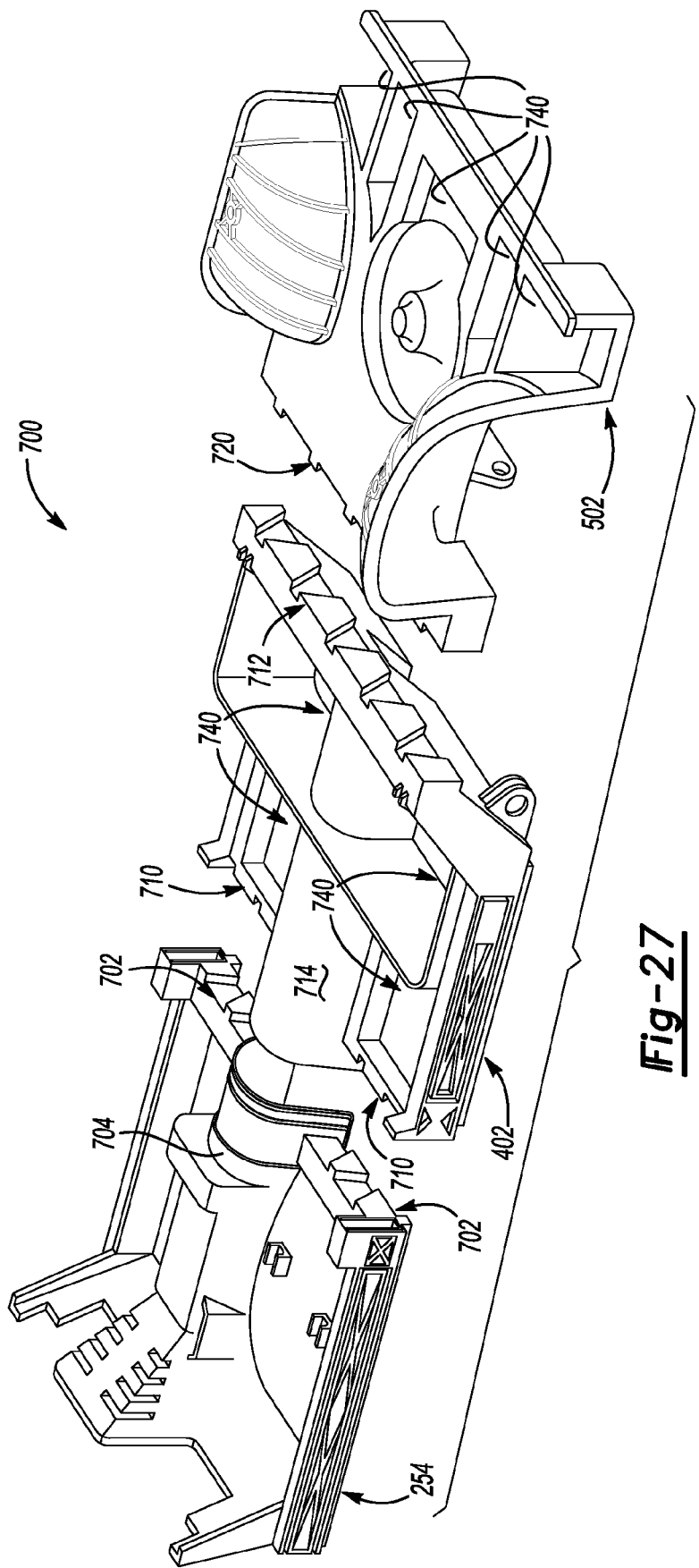
FIG. 27 is an exploded perspective view of a floor structure.

Referring to FIG. 27, an exemplary embodiment of an interlocking floor assembly 700 is shown. The interlocking floor assembly 700 may include a set of floor structure components. In at least one embodiment, the members of the set of floor structure components may be castings and may be made of any suitable material, such as a magnesium or aluminum alloy. In the embodiment shown in FIG. 27, the set of floor structure components includes first, second, and third floor structures 254,402,502.

The members of the set of floor structure components may include one or more sets of mating features that engage or interlock with at least a portion of one other set of mating features to couple the floor structure components together. These mating features may be integrally formed. In at least one embodiment, coupling may be accomplished without welding. In addition, the interlocking mating features may permit a vehicle to be provided without a frame of welded steel components. The mating features may have any suitable configuration as will be discussed in more detail below.

The first floor structure 254 may include a first set of mating features 702 and at least one tunnel. In the embodiment shown, a first tunnel 704 is shown, although additional tunnels may be provided in one or more embodiments of the present invention. For example, additional tunnels may be disposed near one or more sides of the first floor structure 254 to help provide structural rigidity. Such side tunnels may generally extend in a longitudinal direction and may have a smaller size than the first tunnel 704 to provide a generally flat floor surface near an occupant seating location. The first set of mating features 702 may be disposed proximate an end of the first floor structure 254 and may be disposed proximate the first tunnel 704.

The first tunnel 704 may extend between opposing ends of the first floor structure 254. In the embodiment shown, the first tunnel 704 is generally located near the middle of the first floor structure 254 and may provide a passage into which various components, such as a transmission, drive shaft, or conduits may extend.

The second floor structure 402 may include second and third sets of mating features 710,712 and a second tunnel 714. The second set of mating features 710 may engage or interlock with the first set of mating features 702. The second and third sets of mating features 710,712 may be disposed proximate opposite ends of the second floor structure 402. In at least one embodiment, at least one of the second and third sets of mating features 710,712 may be disposed proximate the second tunnel 714. In addition, the second and third sets of mating features 710,712 may be disposed in different planes. In the embodiment shown in FIG. 27, the second set of mating features 710 is generally disposed near a bottom surface of the second floor structure 402 while the third set of mating features 712 may be disposed near an upper surface of the second floor structure 402 and above the second set of mating features 710.

The third floor structure 502 may include a fifth set of mating features 720. The fifth set of mating features 720 may be disposed proximate an end of the third floor structure 502 and may engage or interlock with the fourth set of mating features 712. In at least one embodiment, the third floor structure 502 may include at least a portion of a wheel well of a vehicle 10.

Figure 28:
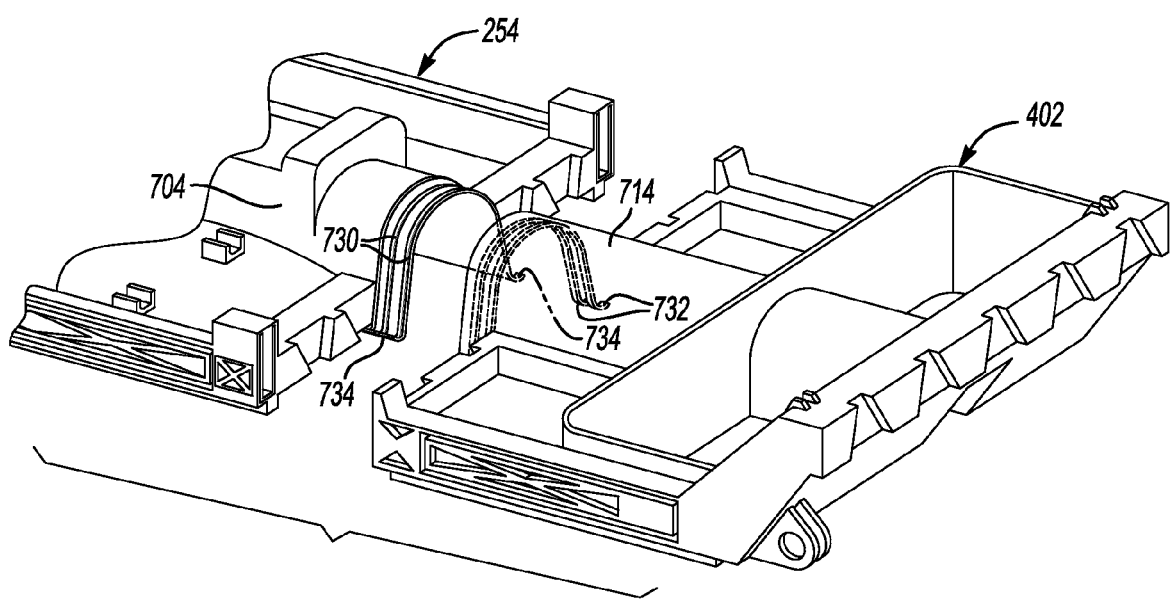
FIG. 28 is an exploded perspective view of a portion of the floor structure shown in FIG. 27.

Referring to FIG. 28, an exemplary interface between the first and second tunnels 704,714 is shown. A portion of the first tunnel 704 may be received by the second tunnel 714 or vice versa. In addition, at least one of the first and second tunnels 704,714 may include first and second sets of tunnel mating features 730,732 and/or a cuff 734. Similar features may be provided with additional tunnels and/or between if provided.

The first and second sets of tunnel mating features 730,732 may engage or interlock to help seal or inhibit fluid leakage between the first and second floor structures 254,402. The tunnel mating features 730,732 may have any suitable configuration. For example, the tunnel mating features 730,732 may have any combination of male or female configurations. In the embodiment shown, the first set of mating features 730 are configured as ribs that extend from an upper surface of the first tunnel 704 while the second set of mating features 732 are configured as grooves that receive the first set of mating features 704 and are disposed on a lower surface of the second tunnel 714.

At least one cuff 734 may be disposed proximate a tunnel. In the embodiment shown, cuffs 734 are disposed on opposite sides of the first tunnel 704. The cuffs 734 may receive and/or position the second tunnel 714 with respect to the first tunnel 704. In addition, the cuffs 734 may be curve or extend upwardly to help inhibit fluids from entering between the first and second floor structures 254,402.

The first, second, and/or third floor structures 254,402,502 may include at least one storage compartment 740. The storage compartments 740 may be integrally formed in a floor structure and may extend from an upper surface of an associated floor structure. Storage compartments may be configured to receive foldable seats, spare tires, storage bins, or the like.

Various exemplary embodiments of mating features that may be provided with vehicle body structure components will now be described in more detail. In at least one embodiment, similarly configured mating features may mate or interlock together to couple vehicle body structure components together. As such, a vehicle body structure 14 or a portion thereof may be assembled without welding. The mating features may be integrally formed with a body structure component, such as by casting. In at least one embodiment, a first type of mating feature may be associated with the engine compartment 20 while a second type of mating feature may be associated with other vehicle areas, such as the passenger compartment 22. In at least one other embodiment, a first type of mating feature may be associated with the engine compartment 20 while second and third types of mating features may be associated with a passenger compartment 22. For example, the passenger compartment 22 may include a second type of mating feature, such as a dovetail mating feature, for connecting most vehicle body structure components, and a third type of mating feature for connecting panels that at least partially define a roof structure to other vehicle body structure components, such as the sides or closure frame structures. In addition, sets of mating features associated with one or more body structure components may be oriented to enable or allow multiple sets of mating features to be engaged simultaneously to facilitate assembly.

The mating features may be configured to interlock and inhibit movement in one or more directions. For example, the mating features may be configured to inhibit movement along multiple axes and in multiple directions that differ from the direction in which one mating feature is inserted into another.

Figure 29:
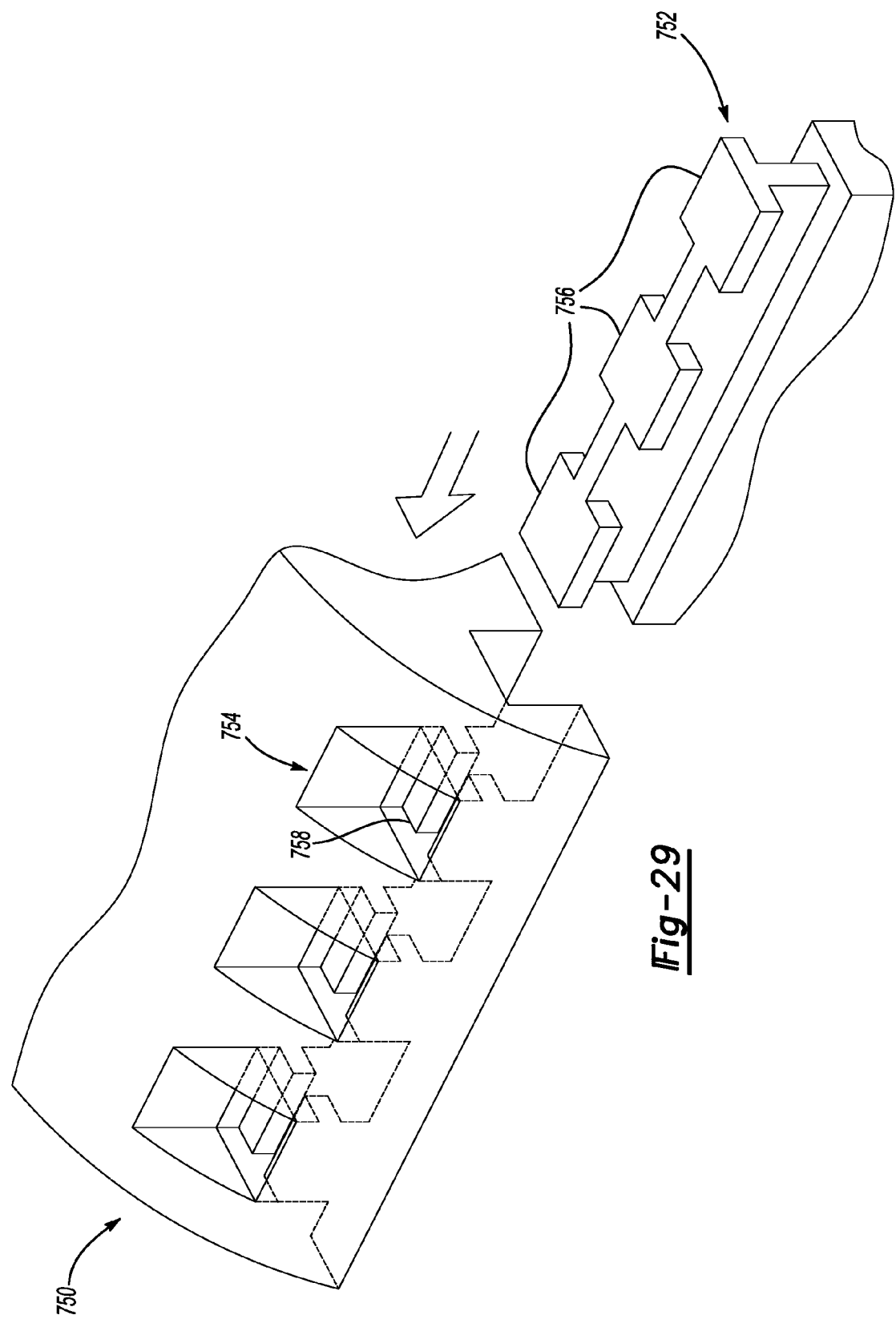
FIGS. 29-36 are various embodiments of mating features that may be provided with vehicle body structure components.

Referring to FIG. 29, one embodiment of a set of mating features 750 is shown. Such a mating feature may be provided in any suitable location, such as at an interface between a roof or upper structure and the sides of the vehicle. The mating feature 750 may include a male portion 752 that is received by a female portion 754. The male portion 752 may include one or more enlarged sections 756 that facilitate interlocking or engagement with the female portion 754. The female portion 754 may include one or more openings for receiving the male portion 752. The openings may have any suitable configuration. In the embodiment shown, a single opening 758 is provided; however, the present invention also contemplates embodiments having a plurality of enlarged openings that may each receive an enlarged section 756. The male portion 752 may be adapted to slide or move relative to the female portion 754 to permit engagement of multiple sets of mating features in a predetermined manner or sequence.

Figure 30:
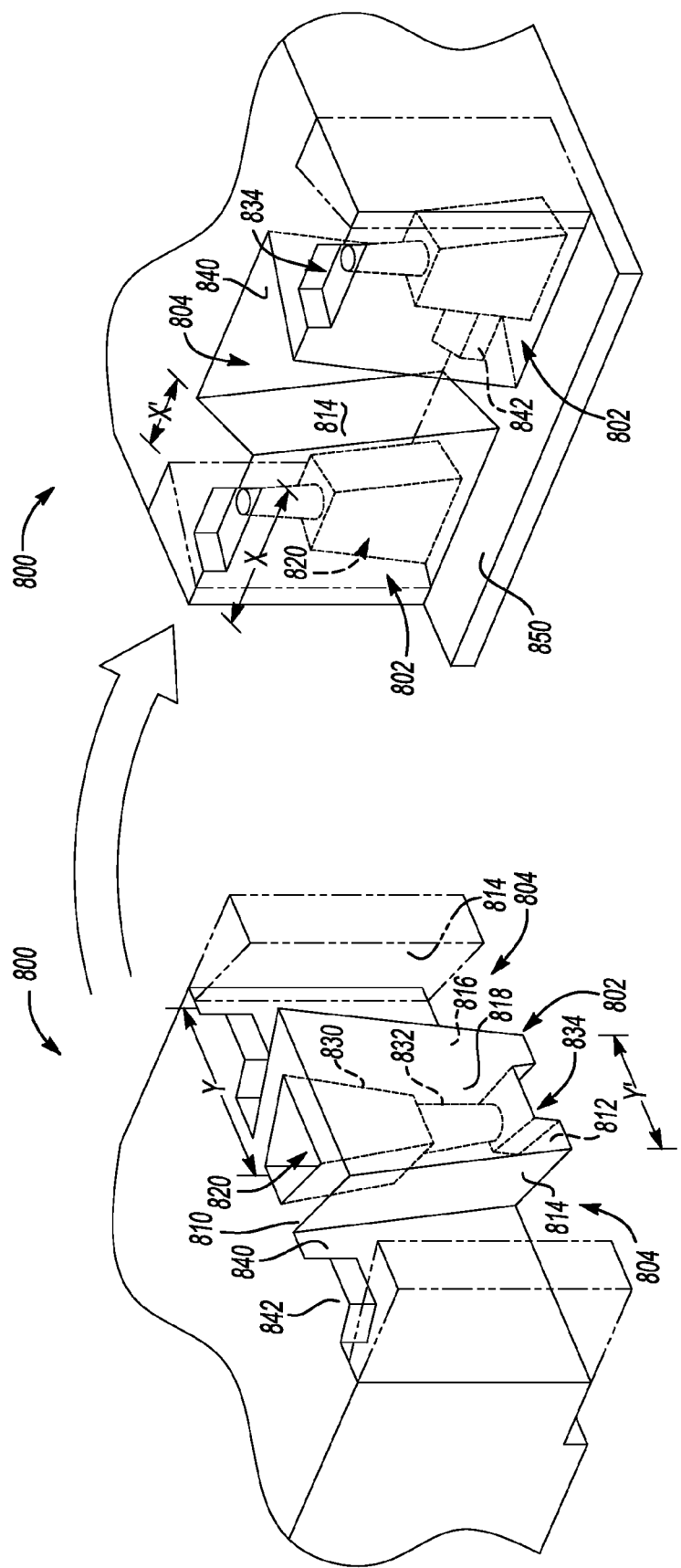

Referring to FIG. 30, one embodiment of a mating feature 800 having a dovetail configuration is shown. The mating feature 800 may include male and female portions 802,804.

The male portion 802 may extend from a vehicle body structure component. In at least one embodiment, the male portion 802 may include a first surface 810, a second surface 812, a first joint surface 814, a second joint surface 816, and a connecting surface 818.

Figure 31:
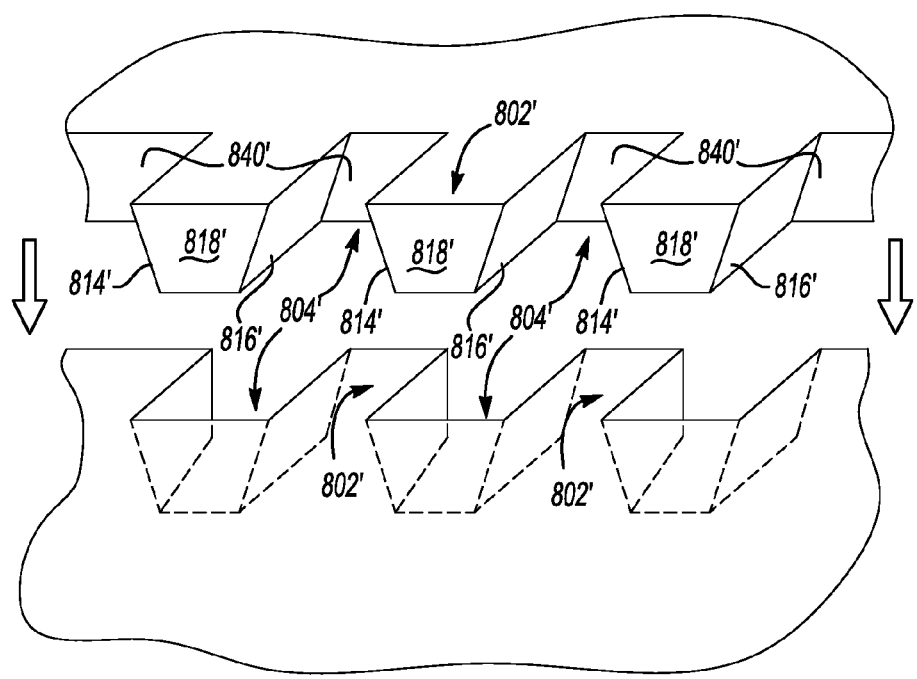

The male portion 802 may include one or more edges or surfaces that extend along intersecting planes. In at least one embodiment, the male portion 802 may have a generally trapezoidal cross section. The male portion 802 may be tapered in multiple directions. In the embodiment shown in FIG. 30, the male portion 802 is tapered from front to back such that the front edge X is longer than the back edge X'. As such, the first and second joint surfaces 814,816 may be tapered in a direction that extends away from the connecting surface 818. In addition, the male portion 802 may be tapered from top to bottom such that the top edge Y is longer than the bottom edge Y'. As such, the first and second joint surfaces 814,816 may be tapered in a direction that extends away from the first surface 810. Of course, the present invention also contemplates embodiments that are not tapered in one or more directions or tapered in directions that differ from those shown in FIG. 30. For instance, the male portion may be tapered from back to front and/or bottom to top in one or more embodiments of the present invention. An example of an embodiment in which the male and female portions are not tapered in a direction extending toward the vehicle body structure is shown in FIG. 31. In this embodiment, the first and second joint surfaces 814',816' associated with the male and female portions 802',804' are not tapered in a direction extending from the connecting surface 818' toward an end surface 840'.

The male portion 802 may also include a channel 820. The channel 820 may be adapted to receive or provide an adhesive to one or more mating feature surfaces as will be described in more detail below. In at least one embodiment, the channel 820 may extend between the first and second surfaces 810, 812. In addition, the channel 820 may narrow or generally follow the contour or tapering of one or more surfaces of the male portion 802. In the embodiment shown in FIG. 30, the channel 820 includes first and second pockets 830,832. The first and second pockets 830,832 may be are disposed adjacent to each other and may be configured such that the first pocket 830 has a larger volume than the second pocket 832. In addition, the channel 820 may be disposed proximate an indentation 834 associated with the second surface 812.

The female portion 804 may be configured to receive a male portion 802 of a mating feature that is provided with another vehicle body structure component. One or more male portions 802 may be disposed adjacent to each female portion 804. The female portion 804 may be at least partially defined by first and second joint surfaces 814,816 that are associated with different male portions 802. In addition, the female portion 804 may include an end surface 840 and a protrusion 842. The end surface 840 may extend from or between one or more male portions 802. The protrusion 842 may extend from the end surface 840 and may be received by an indentation 834 to help locate and position mating male and female portions 802,804. In the embodiment shown in FIG. 30, the protrusion 842 is spaced apart from joint surfaces 814,816 that help define the female portion 804.

A ledge or cap surface 850 may be associated with one or more mating features. The cap surface 850 may be disposed proximate an end of one or more female portions 804 and may extend from one or more male portions 802. For example, the cap surface may extend at least partially across an end of one or more female portions 804 as shown on the right side of FIG. 30. As such, the cap surface 850 may help enclose the mating features, inhibit fluid ingression between adjoining mating feature surfaces, and may provide improved strength. In at least one embodiment, the protrusion 842 may extend from the cap surface 850.

Figure 32:
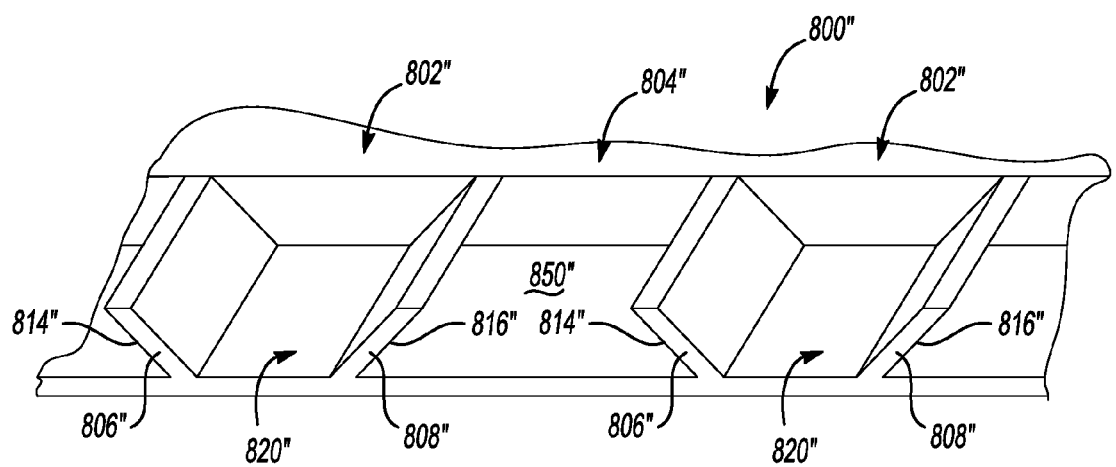

Referring to FIG. 32, another embodiment of a mating feature having a dovetail configuration is shown. In this embodiment, the mating feature 800" may include male and female portions 802",804" having generally trapezoidal cross sections. The male portion 802" may extend from a vehicle body structure component and may be at least partially defined by first and second walls 806",808". The first and second walls 806",808" may include first and second joint surfaces 814",816", respectively. The first and second joint surfaces 814",816" may be tapered relative to each other as previously discussed. A channel 820" may be disposed between the first and second joint surfaces 814",816". The walls 806",808" may extend from a ledge or cap surface 850" to help support the walls 806",808" to help distribute load forces in one or more embodiments of the present invention.

Figure 33:
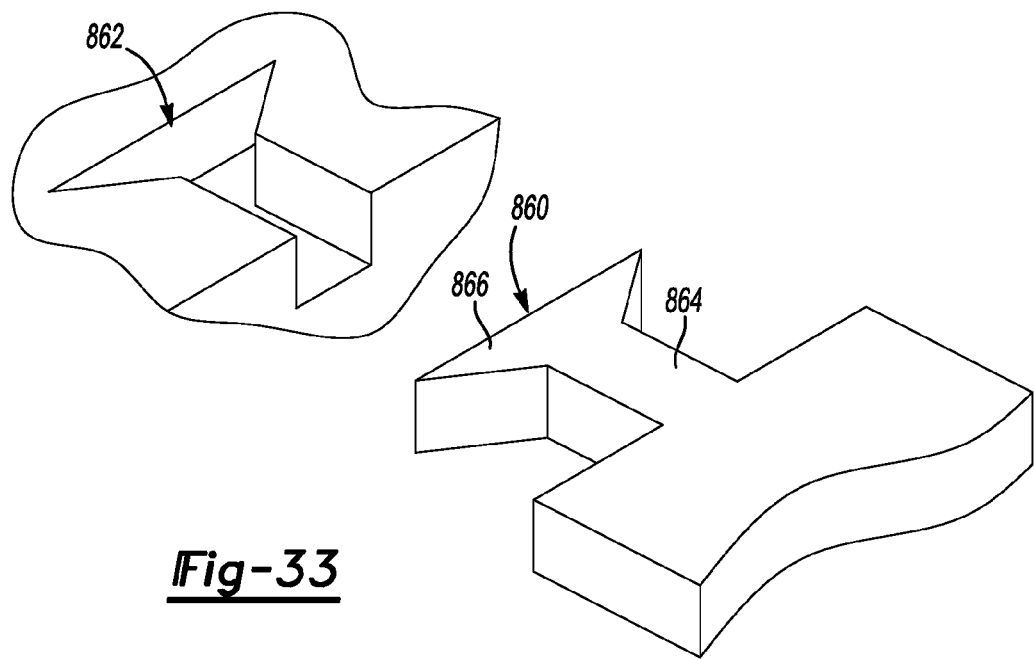
Figure 34:
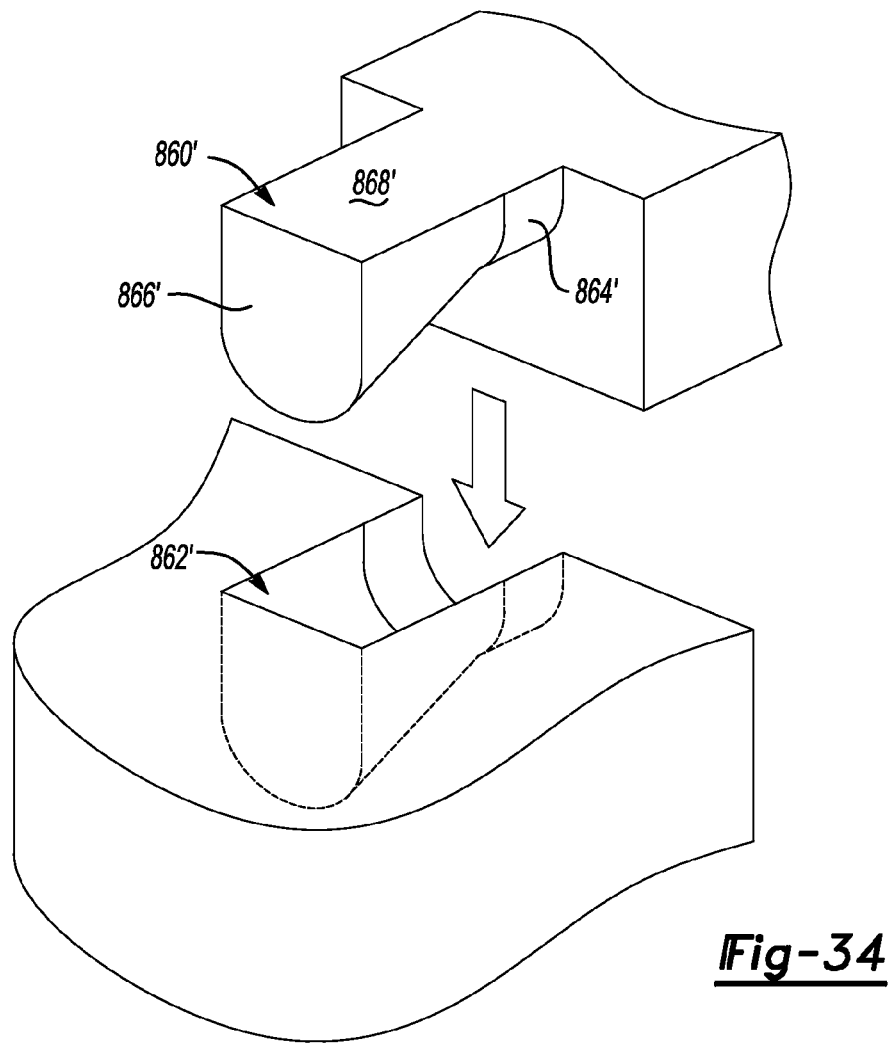

Referring to FIGS. 33 and 34, various other exemplary embodiments of mating features having a dovetail configuration are shown. In FIG. 33, the male and female portions 860,862 have similar configurations. The male portion 860 may include an extension feature 864 disposed between a vehicle body structure component and an enlarged region 866 that interlocks with the female portion 862. The enlarged region 866 may have any suitable configuration. For example, the enlarged region 866 may extend outwardly from the extension feature 864 in one or more directions. For instance, in the embodiment shown in FIG. 34, the enlarged region 866' extends away from the extension feature 864' and from an upper surface 868' of the male portion 860' and may include a non-planar surface that engages a female portion 862' having a compatible configuration.

Figure 35:
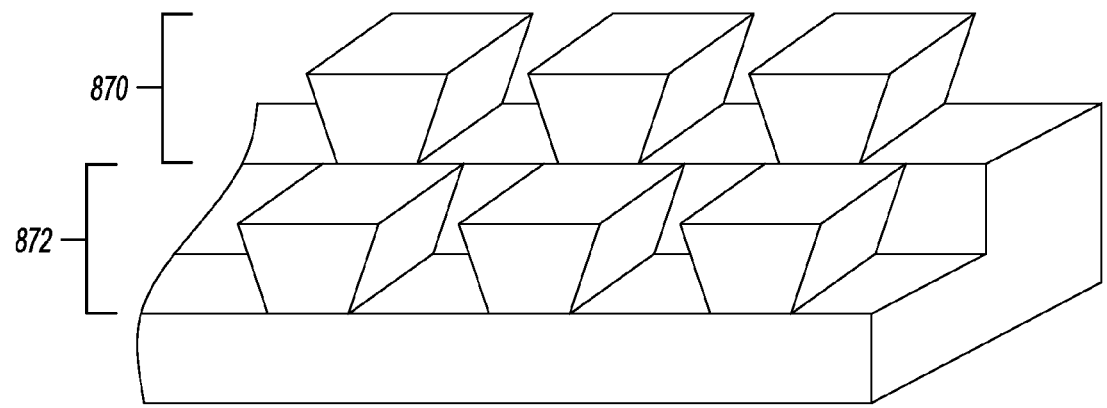
Figure 36:
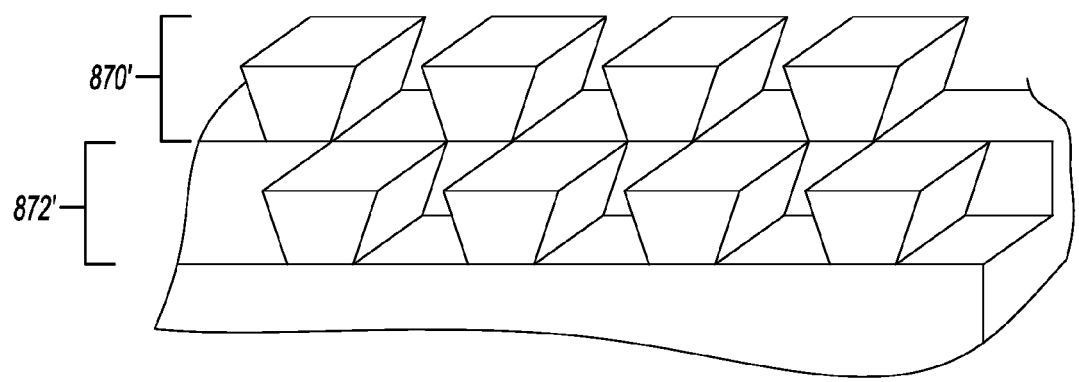
Figure 37A:
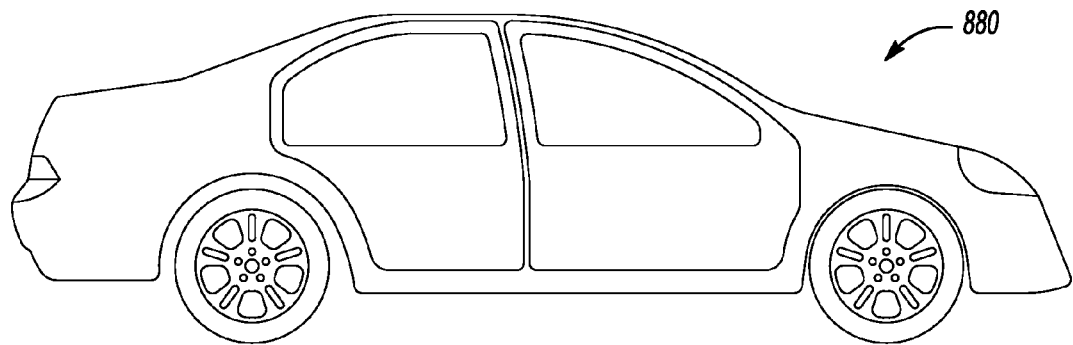
FIGS. 37A-37D are side views of various vehicle configurations.
Figure 37B:
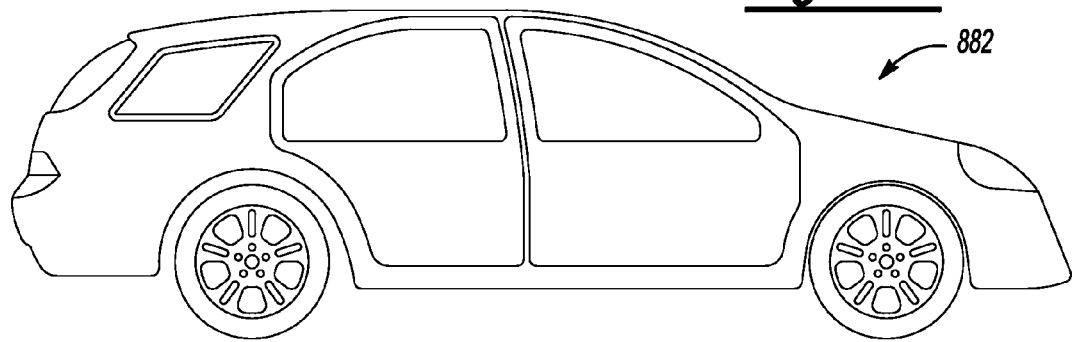
Figure 37C:
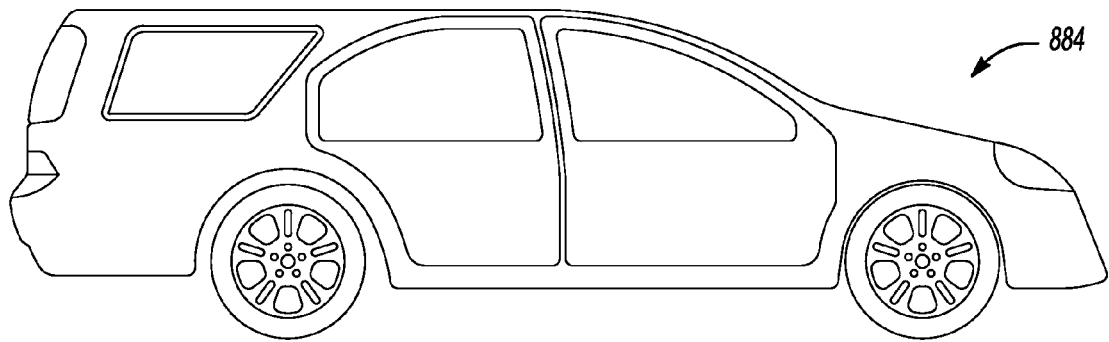
Figure 37D:
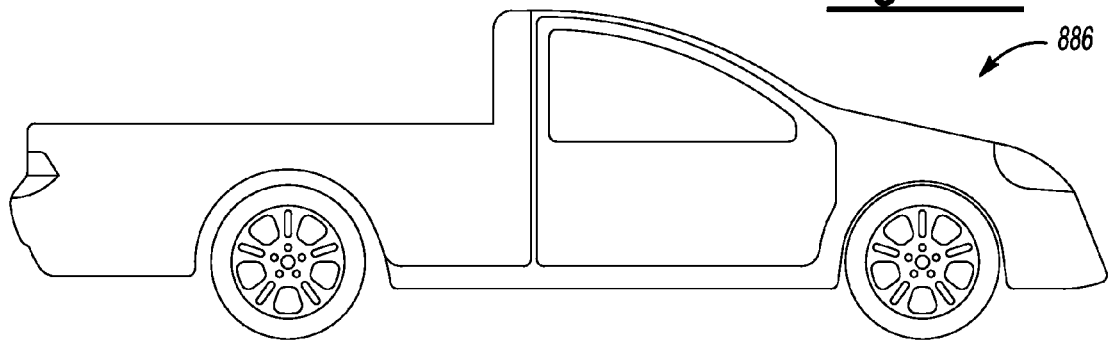

The mating features previously discussed may be provided in various arrangements. For example, the mating features may be provided in one or more rows to provide additional interlocking surfaces and to further distribute load forces. Rows may be provided in any suitable manner. For example, in the embodiment shown in FIG. 35, first and second rows 870,872 of dovetail mating features are provided. The rows 870,872 may be positioned such that one or more mating features in each row are aligned with each other. Alternatively, one or more rows 870',872' of mating features may be provided that have at least some mating features that are staggered or offset from those in another row as shown in FIG. 36. Rows may be disposed adjacent to each other or spaced apart in one or more embodiments of the present invention.

An adhesive may be provided to help bond, fill, and/or seal mating interfaces together. For simplicity, the term adhesive will be used to generically refer to any material or materials that provide one or more of the aforementioned functions. In at least one embodiment, a heat catalyzed mastic material may be employed to fill any gaps between mating surfaces. The adhesive may be provided in any suitable manner. For example, the adhesive may be applied to one or more surfaces of a mating feature before, during or after the mating features are interlocked. In at least one embodiment, the adhesive may be provided via a channel 820 as previously discussed. In addition, the adhesive may facilitate repair or replacement of vehicle body structure components. For example, in at least one embodiment the adhesive may be softened through the application of heat to permit components to be separated.

The vehicle body structure 10 may be assembled by interlocking or engaging mating features in any suitable manner. In at least one embodiment, a subset of vehicle body structure components may be assembled together to form subassemblies that may then be assembled to create a vehicle body structure. For example, vehicle body structure components may be assembled to create the upper portion 18 and lower portion 20, then the upper and lower portions 18,20 may be assembled together to create the vehicle body structure 10. In at least one embodiment, the upper portion 18 may be attached to the lower portion 20 in any suitable manner, such as by engaging or interlocking additional mating features or with one or more fasteners. In other embodiments, subassemblies may be provided by assembling roof, sides, or zones of body structure components together, and then assembling the subassemblies to create the vehicle body structure 10.

Assembling a vehicle body structure with interlocking components may reduce or eliminate equipment and labor associated with body panel stamping and body shop operations in which multiple sheet metal components are welded together to create a vehicle body. In addition, interlocking components may enable a vehicle assembly plant to construct multiple vehicle body styles on a common assembly line. For example, multiple vehicle types like those shown in FIGS. 37a-37d may share one or more vehicle body structure components. Moreover, an interlocking vehicle body structure may permit vehicles to be reconfigured into another vehicle style or type. For instance, a vehicle make be reconfigured from a sedan configuration 880 to a station wagon configuration 882, sport utility/crossover vehicle configuration 884, or a pickup truck configuration 886 by replacing select third and fourth zone vehicle body structure components and body panels. The present invention also contemplates that one or more components in any zone may be replaced or reused to provide additional vehicles or vehicle configurations.

Figure 38:
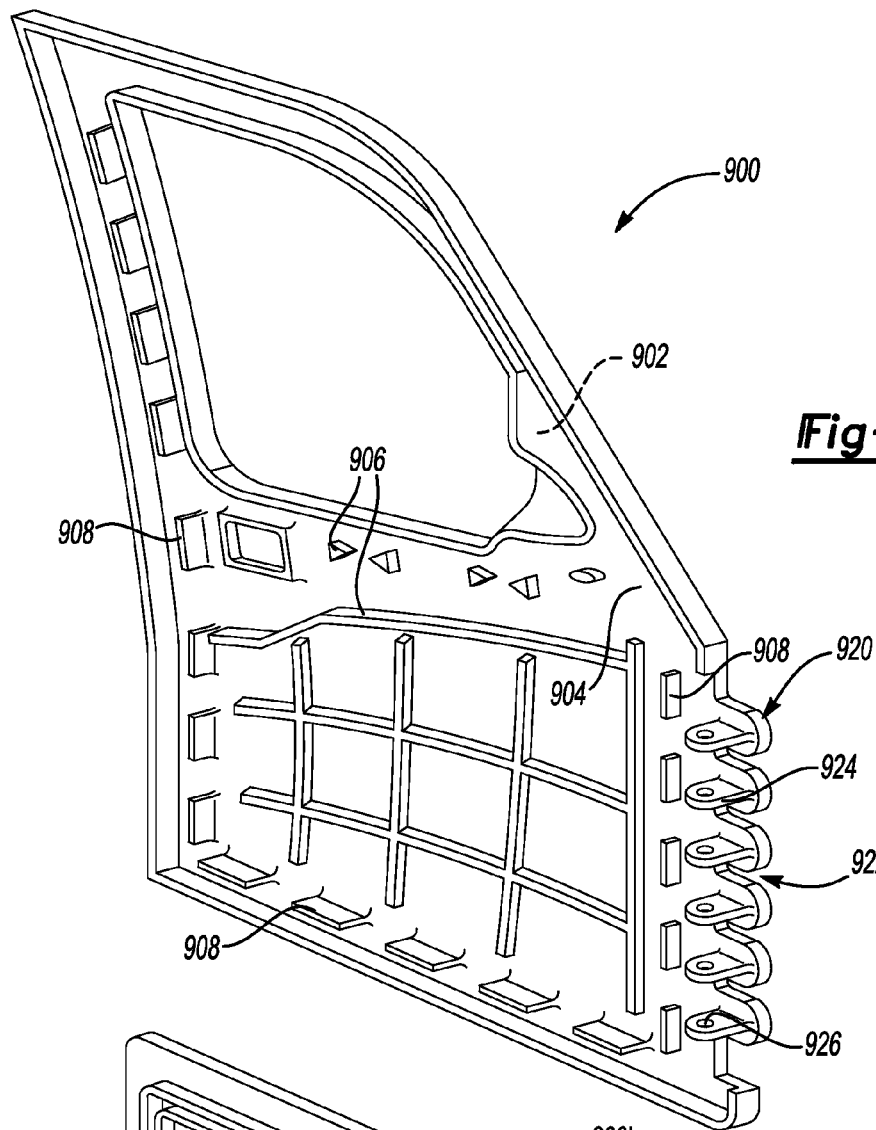
FIGS. 38 and 39 are perspective views of exemplary body panels.

Referring to FIG. 38, an exemplary body panel 900 is shown. The body panel 900 may be configured to cover at least a portion of at least one vehicle body structure component. For example, a plurality of body panels may be disposed on the upper portion 18 of the vehicle body structure 14 and may form an exterior surface of the vehicle 10. The body panels may have any suitable configuration and may be made of any suitable material. For instance, one or more body panels may be made of a polymeric material and may be configured to flex to facilitate mounting and/or removal. In addition, the body panels 900 may be provided with one or more molded-in colors to reduce or eliminate painting or coating of a body panel and reduce associated labor, equipment, and facility costs.

Each body panel 900 may include a first surface 902 and a second surface 904 disposed opposite the first surface 902. The first surface 902 may form an exterior vehicle surface. The second surface 904 may face toward one or more vehicle body structure components. The second surface 904 may include one or more stiffening features 906 that help the body panel 900 retain a desired shape and may provide additional support by engaging a vehicle body structure component. In addition, each body panel 900 may include at least one mating feature 908. The mating features 908 may be disposed proximate any suitable surface. In at least one embodiment, the stiffening features 906 and mating features 908 may be integrally formed with the body panel 900 and may extend from or into the second surface 904.

Figure 39:
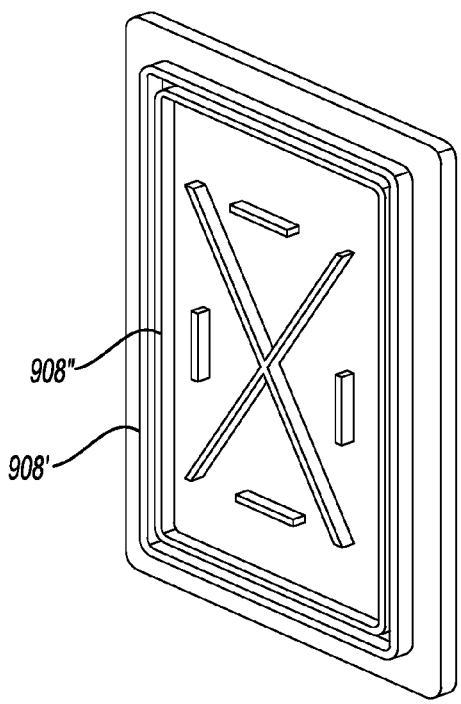

The mating features 908 may have any suitable configuration, such as a male configuration, female configuration, or combinations thereof. In the embodiment shown in FIG. 38, a plurality of mating features 908 extend from the second surface 904 and are disposed near a perimeter of the body panel 900. As such, one or more mating features 908 may also provide localized stiffening of the body panel 900. In at least one embodiment, a mating feature may in a generally continuous manner relative to one or more sides of the body panel. For instance, a mating feature 908' may extend into or away from a body panel 900' and may extend in a ringlike manner around a portion of the body panel 900' as shown in FIG. 39 to provide a seal that inhibits moisture from passing between the body panel 900' and at least one associated vehicle body structure component. In at least one embodiment, the mating feature 908' may also include a second ring 908" that can accommodate an associated body mating feature having a male and/or a female configuration.

Referring again to FIG. 38, the body panel 900 may include a set of hinge covers 920. The set of hinge covers 920 may be disposed along a side of the body panel 900 any may be configured to at least partially conceal a closure hinge area. The members of the set of hinge covers 920 may be spaced apart from each other to create a gap 922. A portion of a hinge cover disposed on another body panel may extend into the gap 922 as is best shown in FIG. 1.

Figure 40:
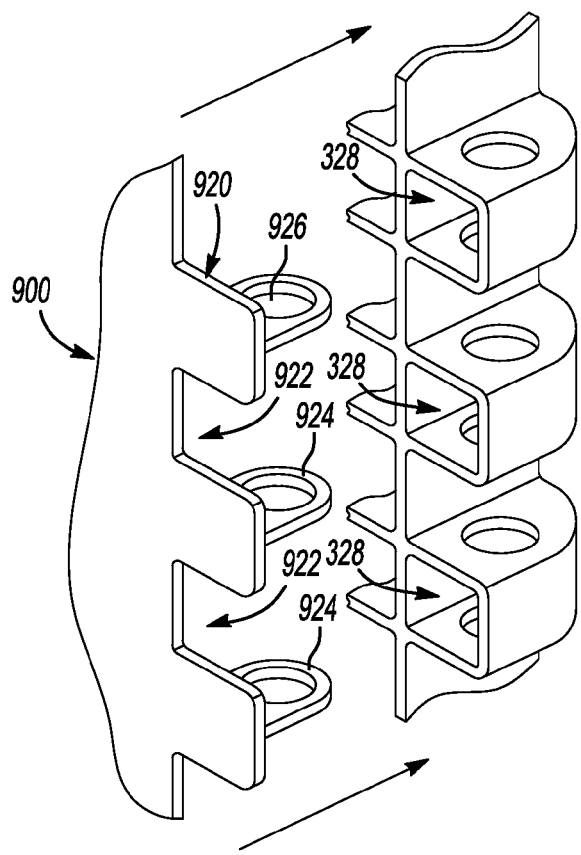
FIGS. 40 and 41 are fragmentary perspective views of hinge cover portions of a body panel.
Figure 41:
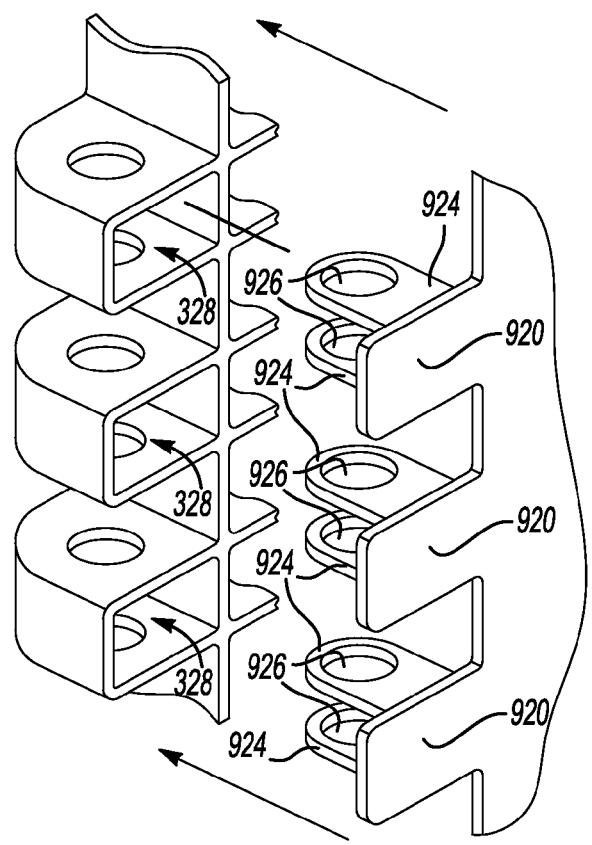

One or more members of the set of hinge covers 920 may include at least one flange 924 that extends away from the second surface 904 and further facilitates mounting of the body panel 900. The flange 924 may include an aperture 926 through which the hinge pin 340 of a closure hinge may extend. The flange 924 may be disposed proximate an associated hinge portion, such as hinge portions 298 or 320, when the body panel is assembled to the vehicle body structure 14. For example, the flange 924 may be disposed proximate a pocket 328 of a hinge portion 298,320 as represented in FIG. 40. In at least one embodiment, a plurality of flanges 924 may extend from a hinge cover 920 and may be disposed proximate opposing walls that at least partially define the pocket 328 as shown in FIG. 41.

Figure 42:
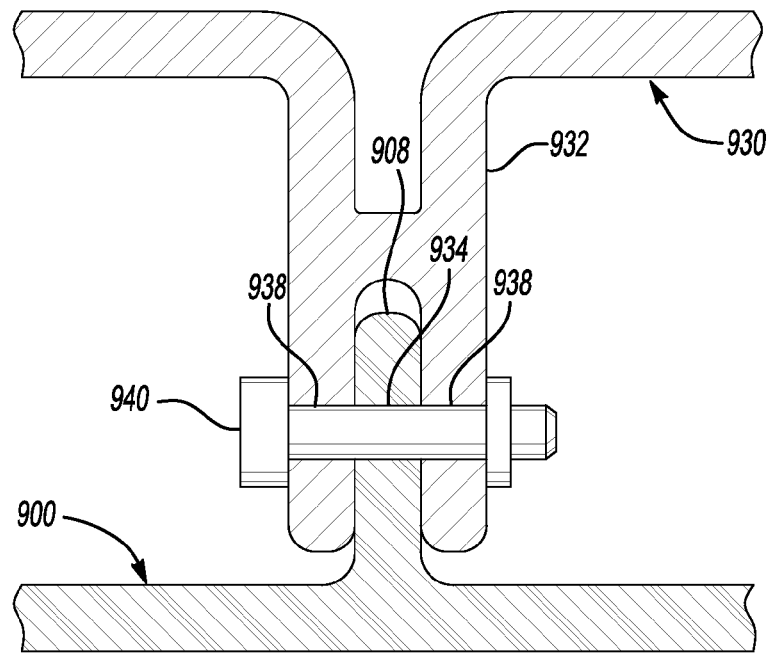
FIGS. 42-46 are exemplary embodiments of connections between body panels and the vehicle body structure.

Referring to FIG. 42, a magnified view of an exemplary connection between a body panel 900 and a vehicle body structure component is shown. Reference number 930 will be used to generically refer to a vehicle body structure component since multiple body structure components may engage at least one body panel.

In the embodiment shown, the body panel 900 includes a body panel mating feature 908 having a male configuration and the vehicle body structure component 930 includes a body structure mating feature 932 having a female configuration. The body structure mating feature 932 may partially or completely extend into the body structure component in one or more embodiments of the present invention.

The body panel mating feature 908 may protrude from the body panel 900 and may include a hole 934. The body structure mating feature 932 may be configured as a groove having at least one hole 938 that may be coaxially aligned with hole 934. A fastener 940 may extend through at least one hole 938 in the body structure component 930 and the hole 934 in the body panel 900 to inhibit removal of the body panel 900. Installation of the fastener 940 may be facilitated by an opening provided in a vehicle body structure component 930. For instance, the fastener 940 may be inserted through an opening that faces the engine or passenger compartment 22,24 rather than through an opening in the body panel 900 in one or more embodiments of the present invention. Such embodiments may inhibit unintended or unauthorized removal of a body panel since access to the interior of the vehicle may be needed to access a fastener.

Figure 43:
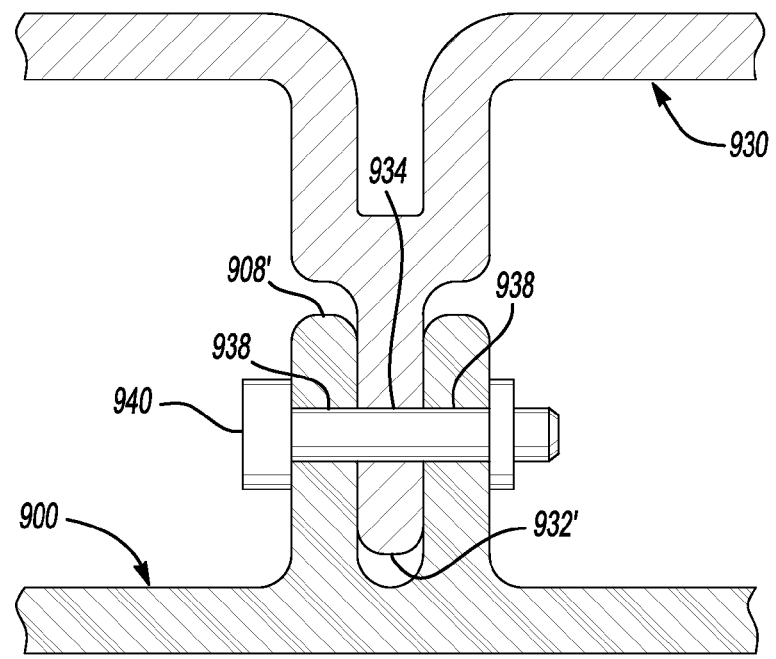
Figure 44:
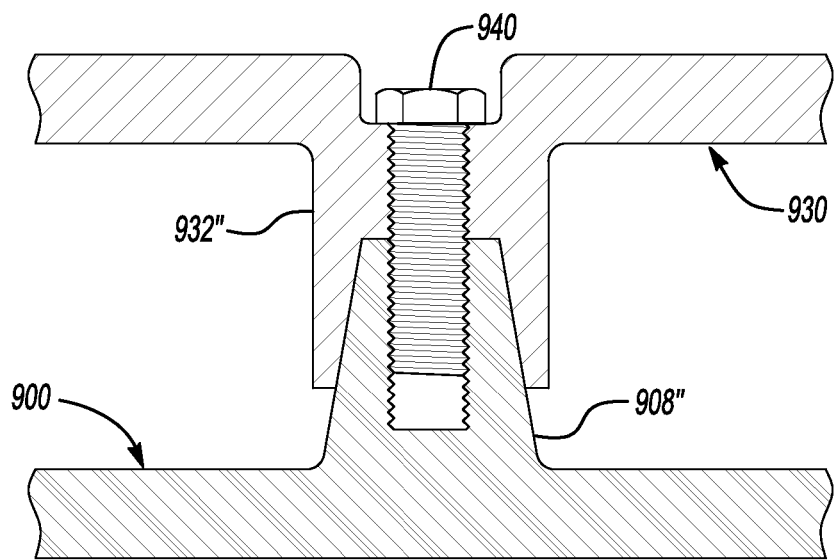

Referring to FIGS. 43 and 44, additional exemplary connections between a body panel and a vehicle body structure component is shown. In the embodiment shown in FIG. 43, the body panel 900 includes a body panel mating feature 908' having a female configuration and the vehicle body structure component 930 includes a body structure mating feature 932' having a male configuration. A fastener 940 may extend through at least one hole 934 in the body panel 900 and the hole 938 in the body structure component 930 to inhibit removal of the body panel 900. In the embodiment shown in FIG. 44, the fastener 940' may extends through a hole in the body structure mating feature 932" and may engage the body panel mating feature 908" to couple or otherwise inhibit removal of the body panel 900.

Figure 45:
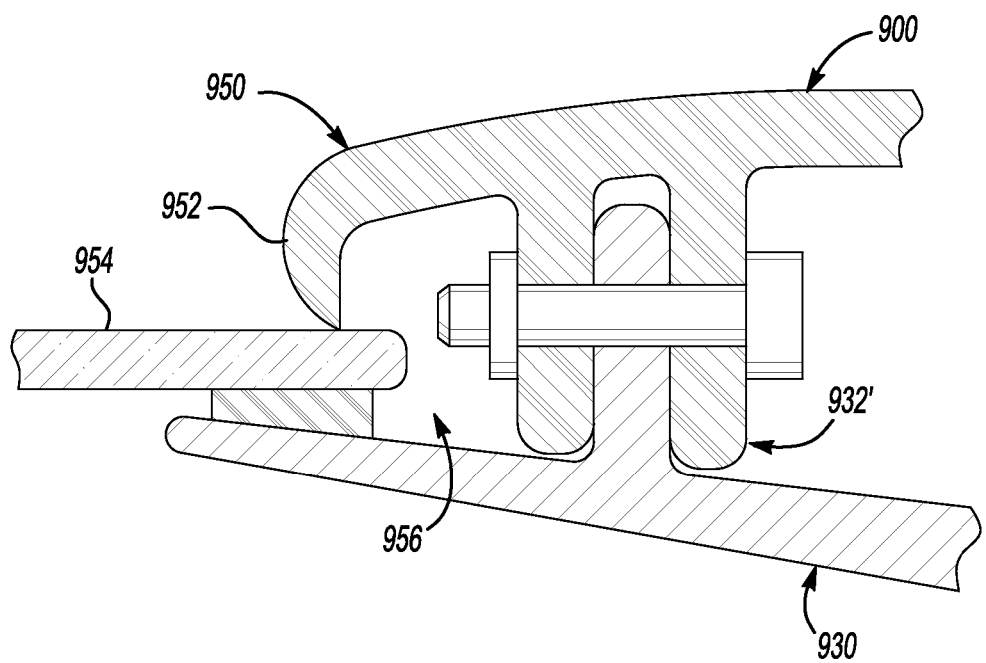
Figure 46:
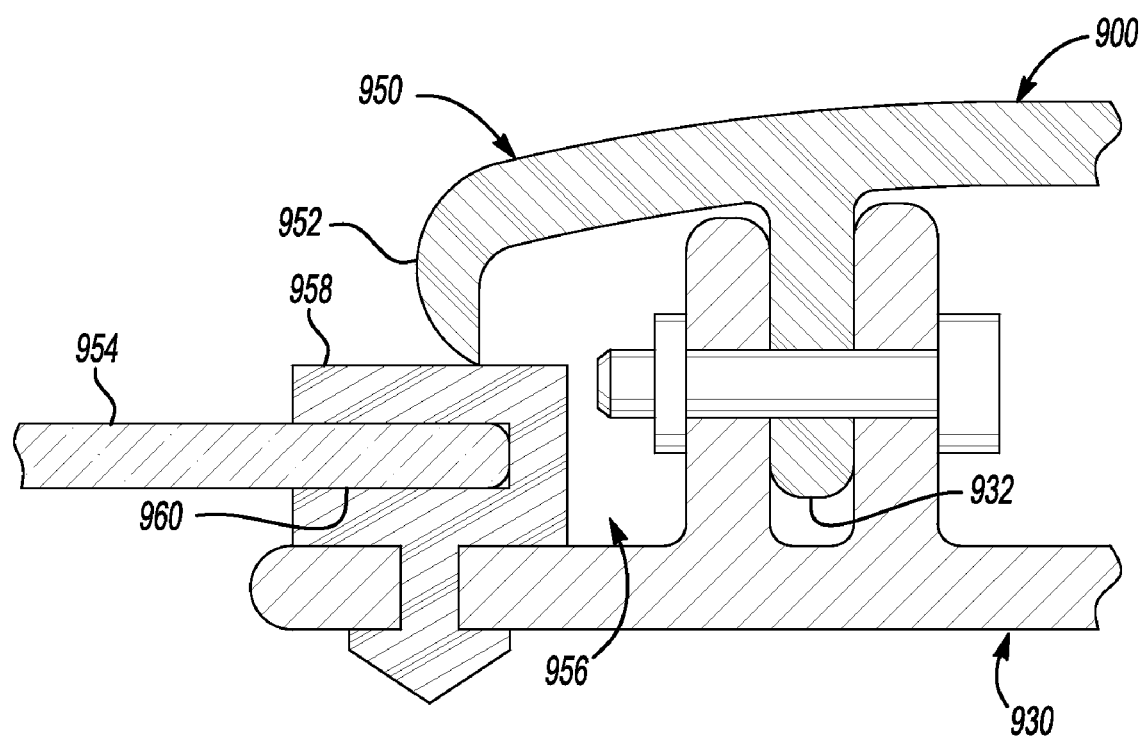

Referring to FIGS. 45 and 46, additional views of a vehicle body panel are shown. The body panel 900 may include a flexible rim 950 may at least partially define a perimeter surface of the body panel 900 and may generally extend from a body panel mating feature 932,932'. In at least one embodiment, the flexible rim 950 may include an end portion 952 that extends toward the vehicle body structure 14.

The body panel 900 may be adapted to accommodate expansion and/or contraction of one or more vehicle surfaces or components. For example, the flexible rim 950 may extend toward and contact a vehicle body component, such as a window 954, and may flex to accommodate movement and/or help the body panel 900 maintain contact with the window 954 to inhibit moisture ingression. In addition, a gap 956 may be disposed the body panel mating feature 932,932' and the window 954 to accommodate expansion and contraction. The gap 956 may also disposed adjacent to an edging member 958 that is associated with the vehicle body component. The edging member 958 may include a window groove 960 for receiving the window 954, which may be configured to guide movement of the window 954. The edging member 958 may be attached to another component, such as a body structure component 930 in any suitable manner.

The connection structures and techniques described above may permit a body panel to be assembled to a vehicle body structure free of welding. Moreover, the connection structures and techniques may provide flexibility in vehicle assembly processes as body panels may be assembled to one or more body structure components either before or after assembly of a portion of the vehicle body structure 14. Such flexibility may help improve equipment and assembly plant utilization and provide associated cost advantages. In addition, the connection structures and techniques may permit a body panel to be easily removed and replaced, thereby enabling changes to a vehicle color or configuration after initial assembly. For example, vehicle purchasers or dealers may remove and replace body panels to provide a different vehicle appearance or accommodate the installation of different vehicle body structure components. In addition, in at least one embodiment of the present invention, servicing and/or replacement of vehicle components may be improved. For example, parts that may be more likely to be damaged may be configured to be easily repaired and/or accessed.

While the best mode for carrying out the invention has been described in detail, those familiar with the art to which this invention relates will recognize various alternative designs and embodiments for practicing the invention as defined by the following claims.

What is claimed:

1. A method of manufacturing a vehicle, comprising:
   selecting first and second subsets from a set of body structure components;
   assembling a floor portion by interlocking members of the first subset, wherein a first member has substantially parallel tunnel ribs that are spaced apart and extend continuously from a first upwardly extending cuff over a tunnel to a second upwardly extending cuff and that are received in corresponding tunnel grooves in a second member;
   assembling an upper portion by interlocking members of the second subset; and
   assembling the upper portion to the floor portion.

2. The method of claim 1 wherein the step of assembling the upper portion further comprises interlocking a portion of the second subset to create a passenger compartment.

3. The method of claim 2 wherein the portion of the second subset that creates the passenger compartment is assembled by interlocking dovetail mating features.

4. The method of claim 3 wherein the step of assembling the upper portion further comprises providing an adhesive to the interlocking dovetail mating features.

5. The method of claim 4 wherein the adhesive is provided through a channel that is provided with at least one of the interlocking dovetail mating features.

6. The method of claim 1 wherein at least some of the members of the set of vehicle body structure components are castings made of a magnesium alloy.

7. A method of manufacturing a vehicle, comprising:
   providing first and second sets of castings;
   assembling a floor portion by interlocking members of the first set of castings, wherein a first member has ribs extending between first and second upwardly extending cuffs, the ribs being received in grooves on a second member;
   assembling an upper portion by interlocking members of the second set of castings; and
   assembling the upper portion to the floor portion.

8. The method of claim 7 wherein each member of the first set of castings further comprises a plurality of dovetail mating features, wherein the plurality of dovetail mating features of a first member of the set of castings interlocks with the plurality of dovetail mating features of another member of the set of castings.

9. The method of claim 7 wherein at least one member of the second set of castings further comprises first and second types of mating features that differ from each other.

10. The method of claim 9 wherein the first type of mating feature is employed to interlock members of the second set of castings that at least partially define a passenger compartment.

11. The method of claim 9 wherein the second type of mating feature is employed to interlock members of the second set of castings that at least partially define an engine compartment.

* * * * *